Figure 1C:
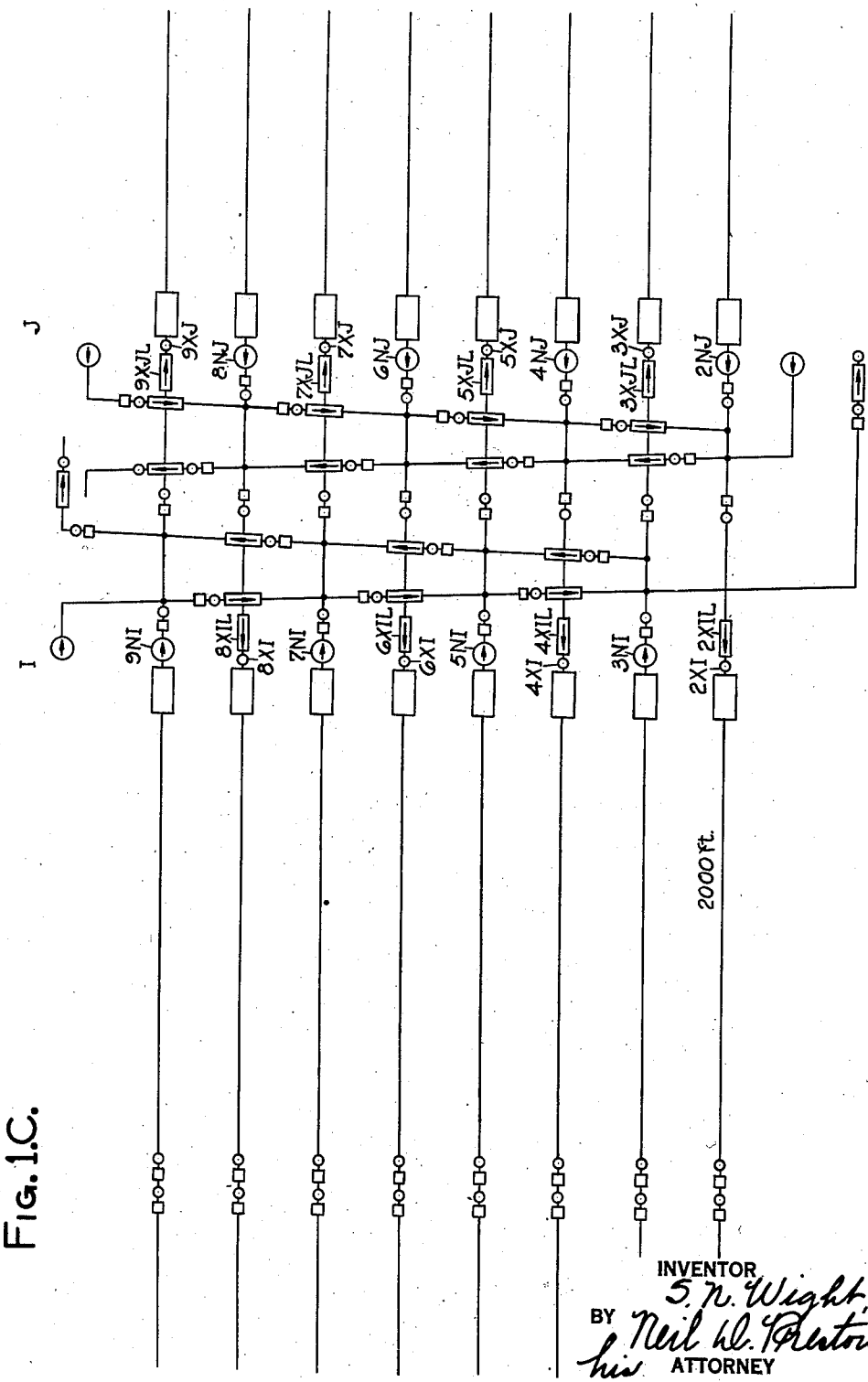

March 21, 1944. S. N. WIGHT 2,344,759
AIRPLANE DISPATCHING SYSTEM
Filed Feb. 24, 1942 13 Sheets-Sheet 1
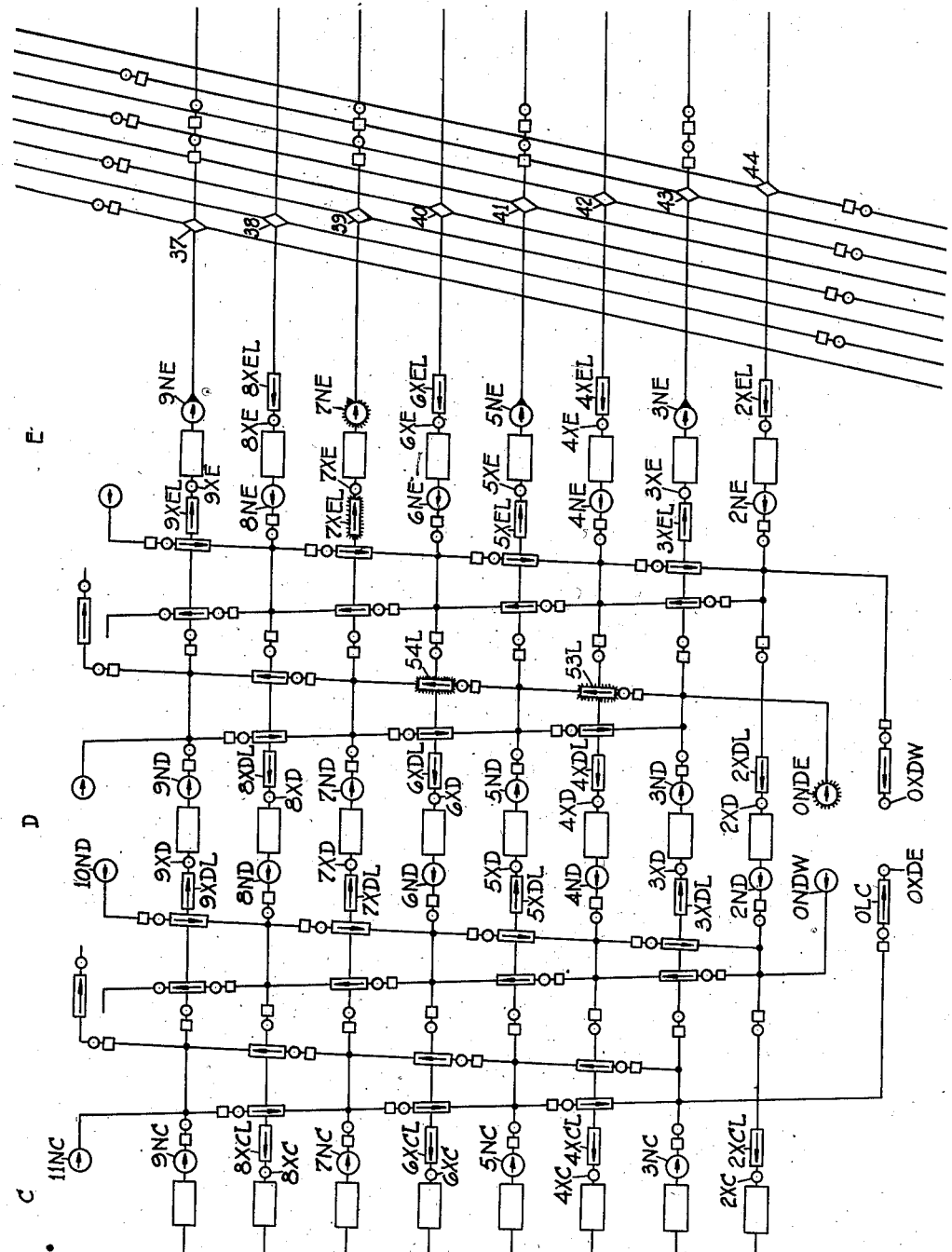
Fig.1.A.
INVENTOR
S. N. Wight.
BY Neil W. Preston,
his ATTORNEY

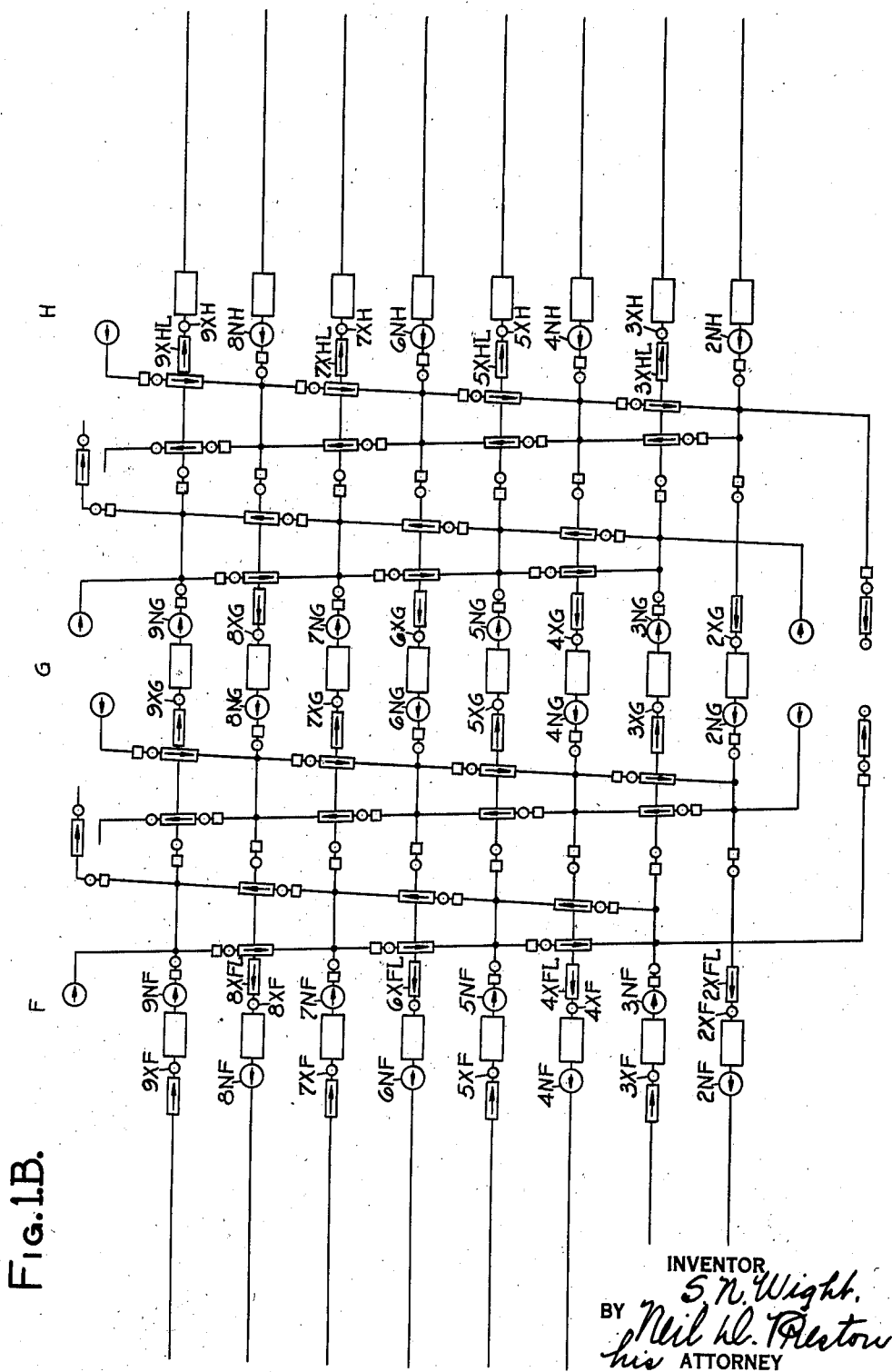

March 21, 1944. S. N. WIGHT 2,344,759
AIRPLANE DISPATCHING SYSTEM
Filed Feb. 24, 1942 13 Sheets-Sheet 3

INVENTOR
S. N. Wight
BY Neil W. Preston
his ATTORNEY

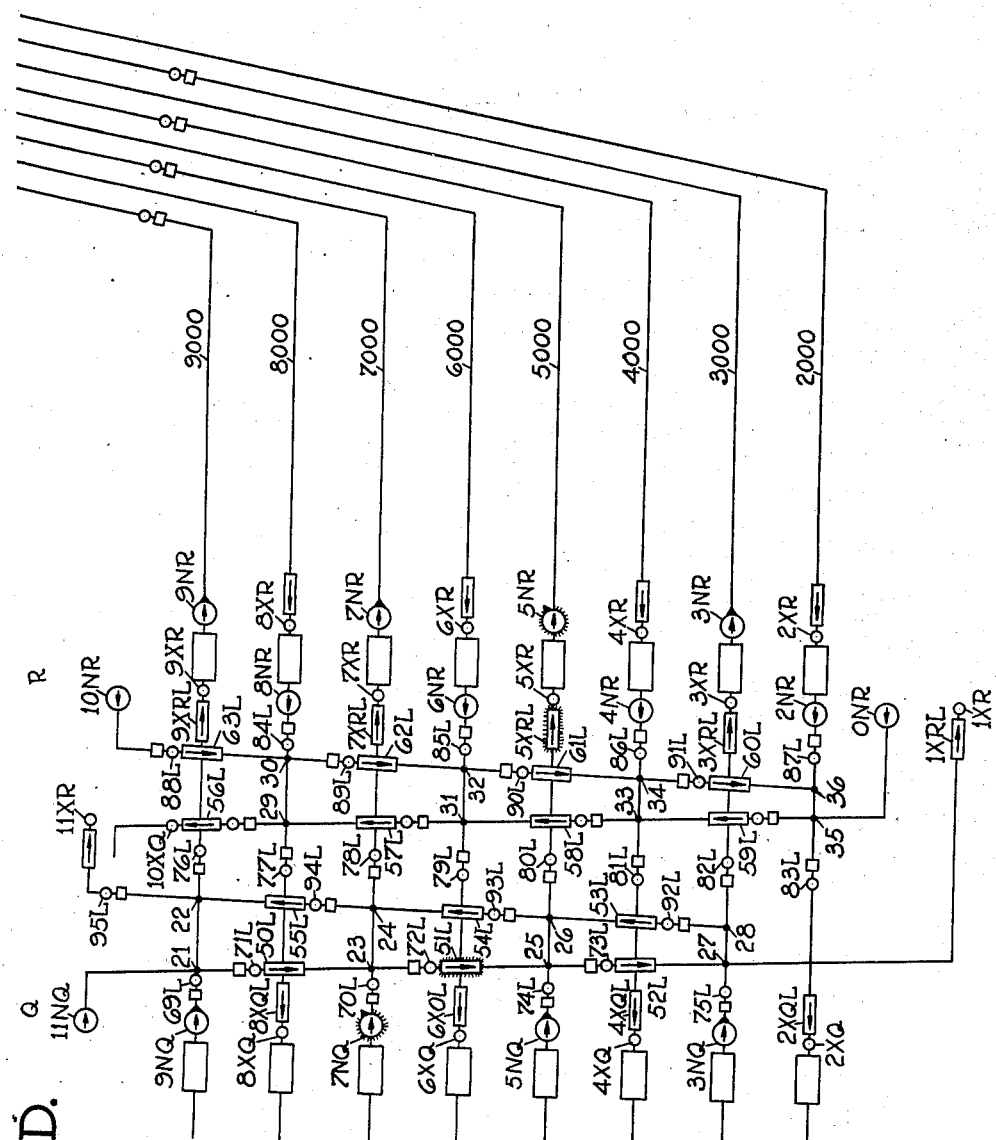

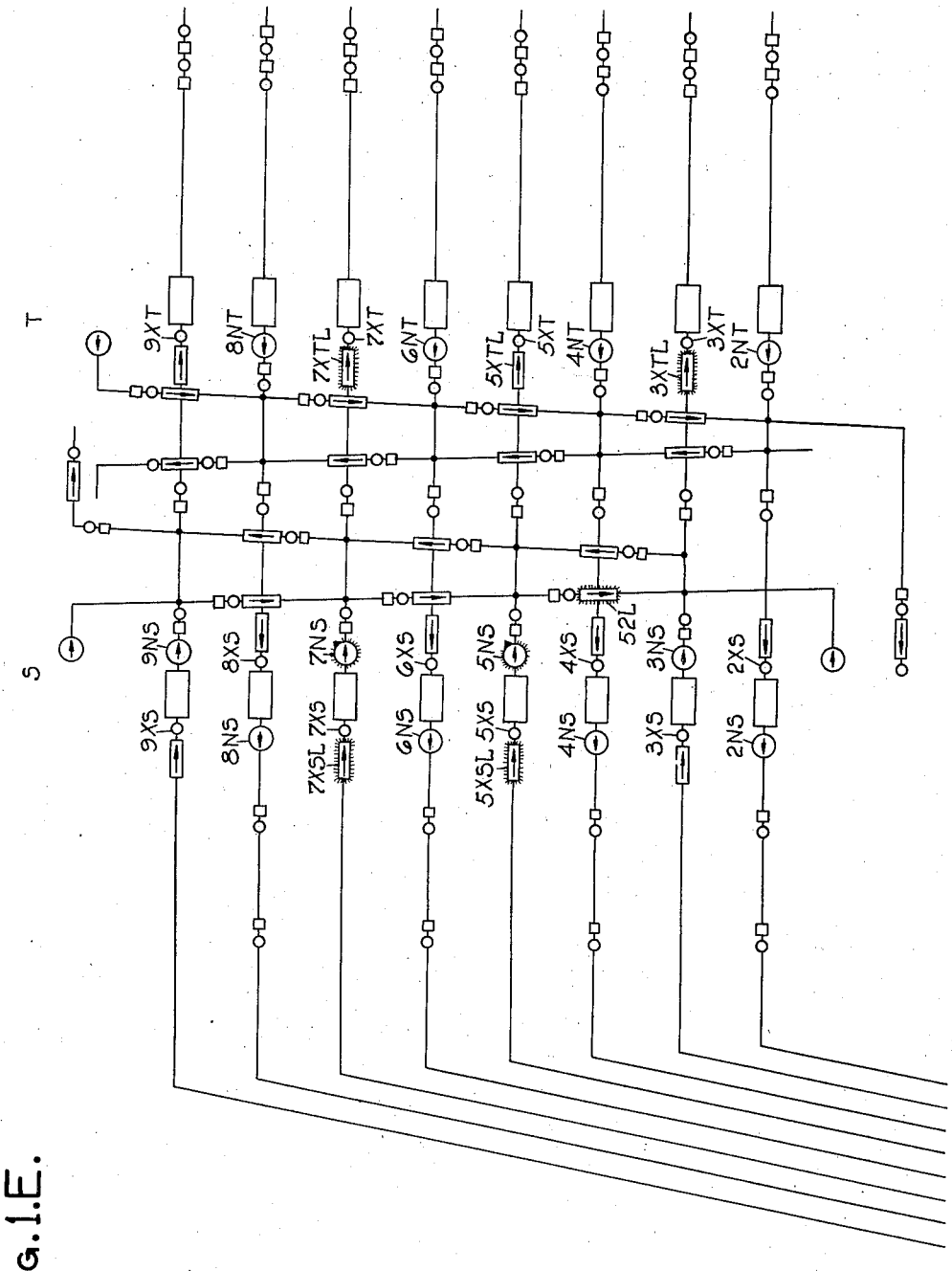

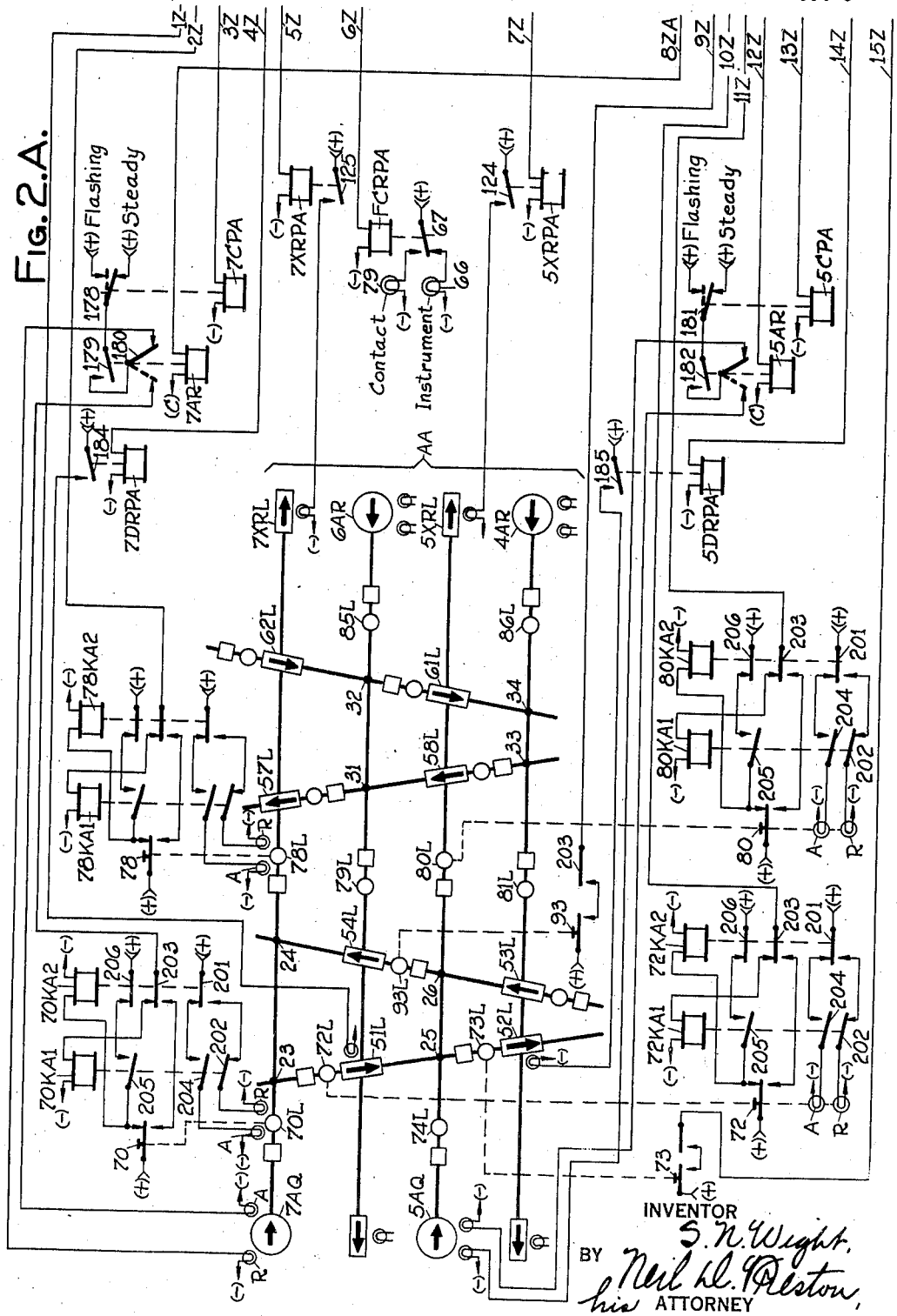

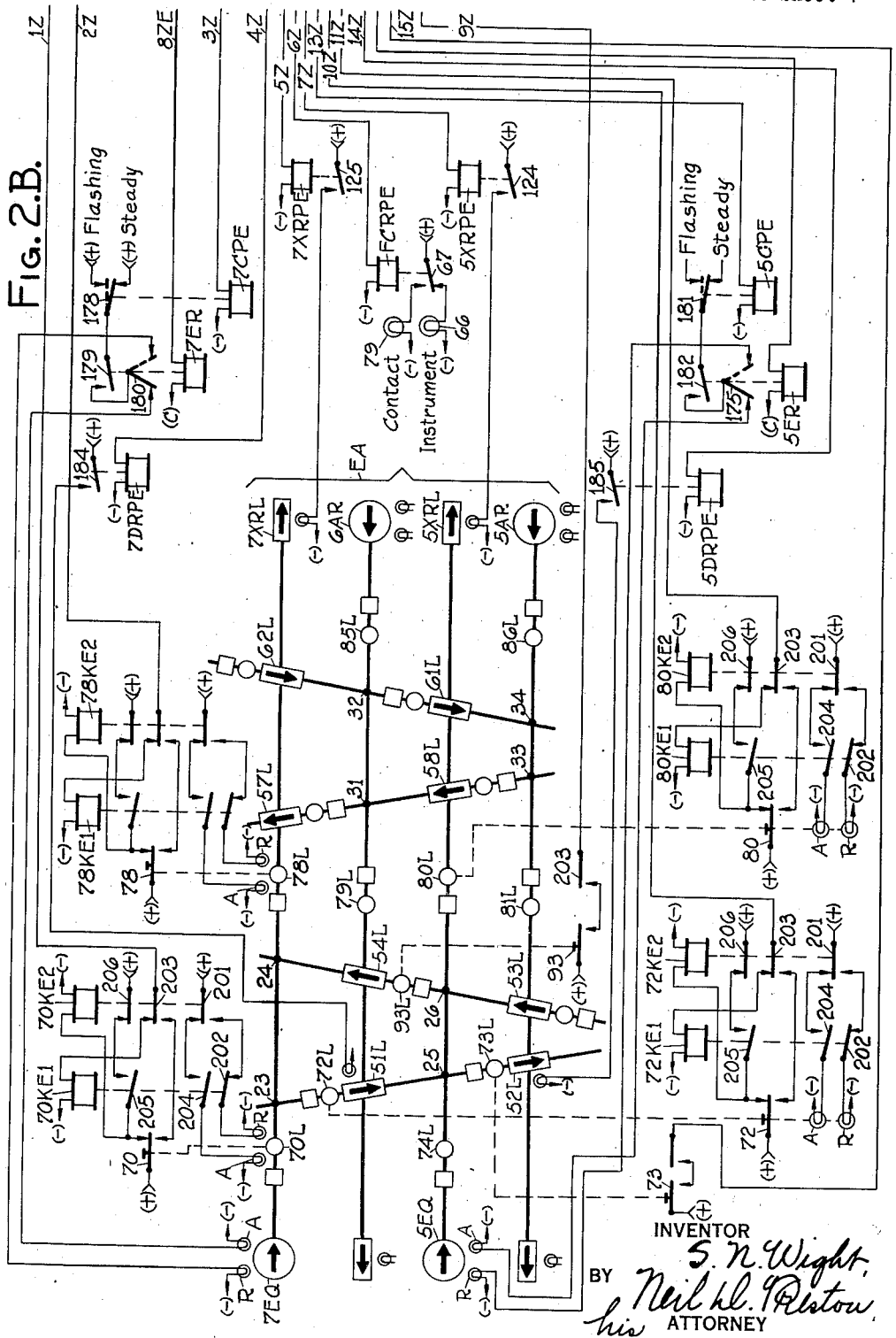

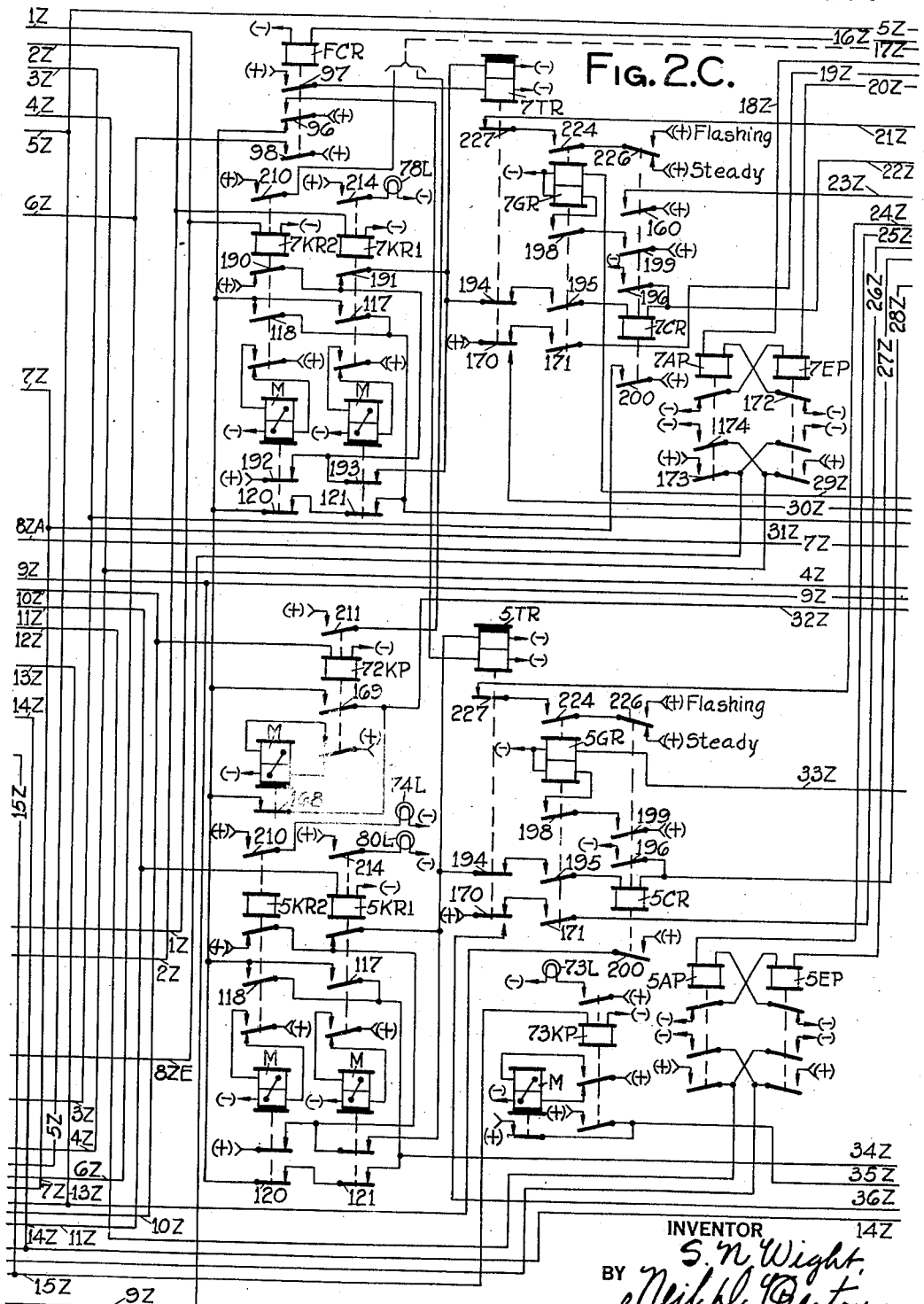

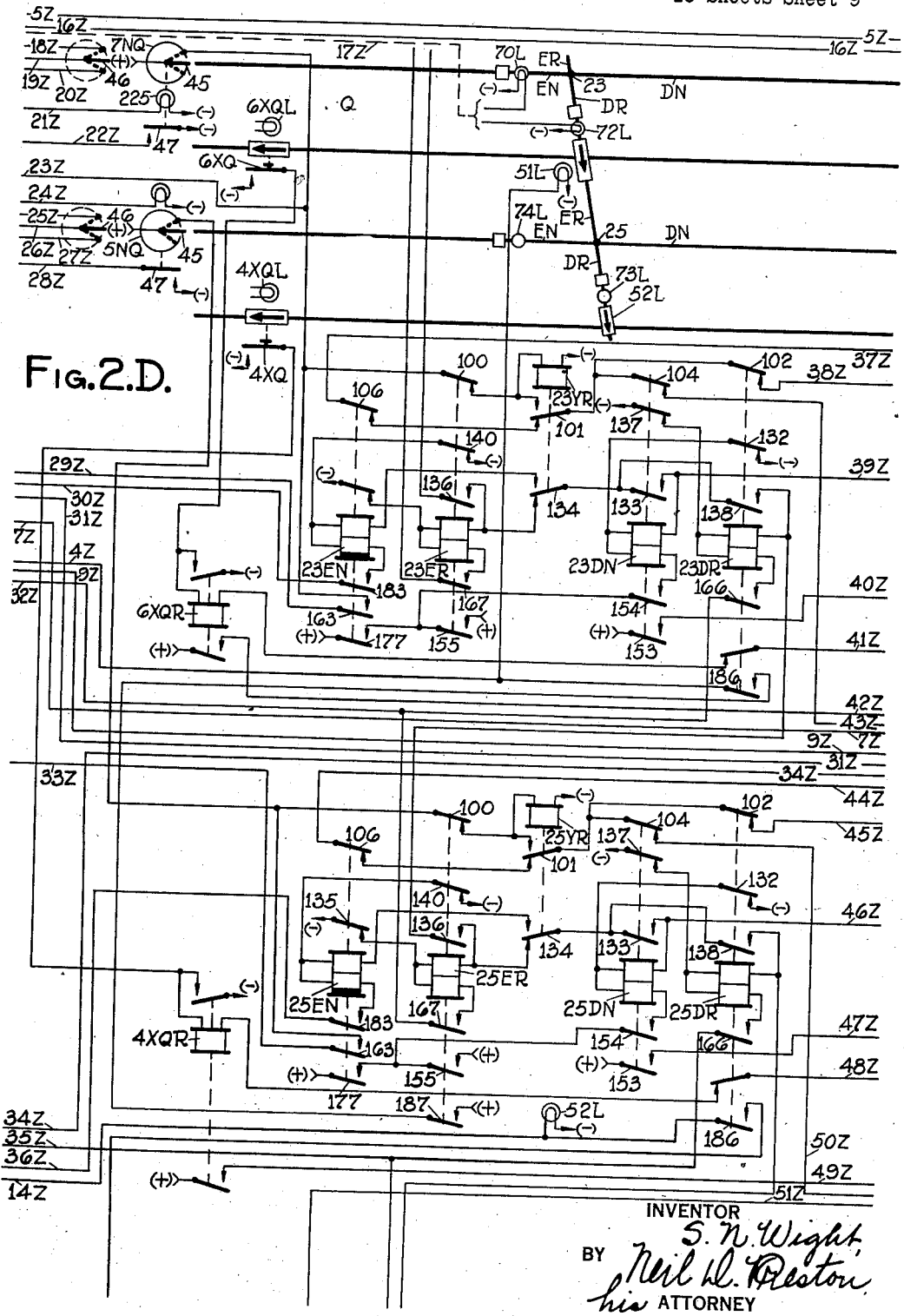
Fig. 2.D.

March 21, 1944. S. N. WIGHT 2,344,759
AIRPLANE DISPATCHING SYSTEM
Filed Feb. 24, 1942 13 Sheets-Sheet 10
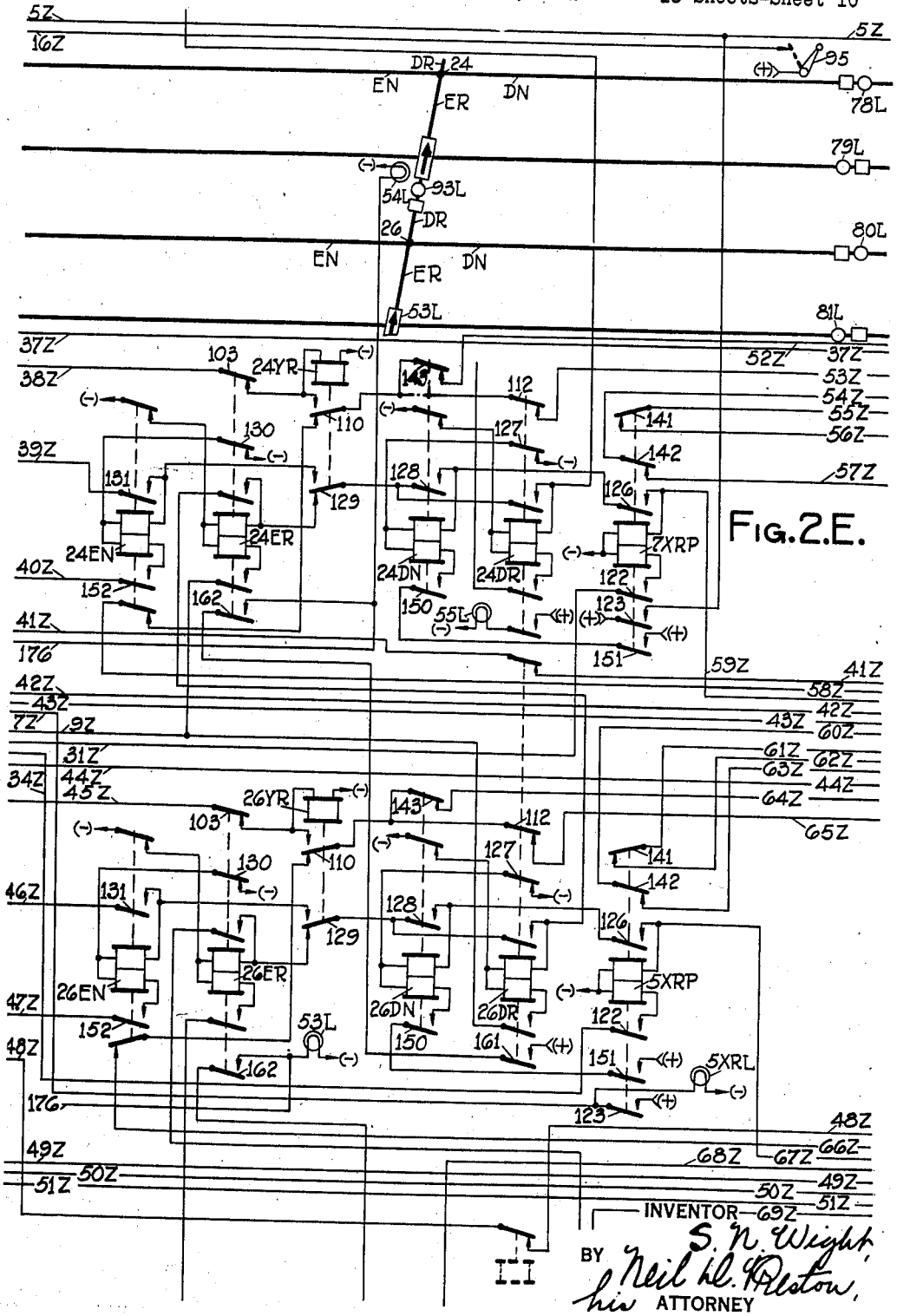
Fig. 2.E.
INVENTOR
S. N. Wight
BY Neil W. Preston
his ATTORNEY

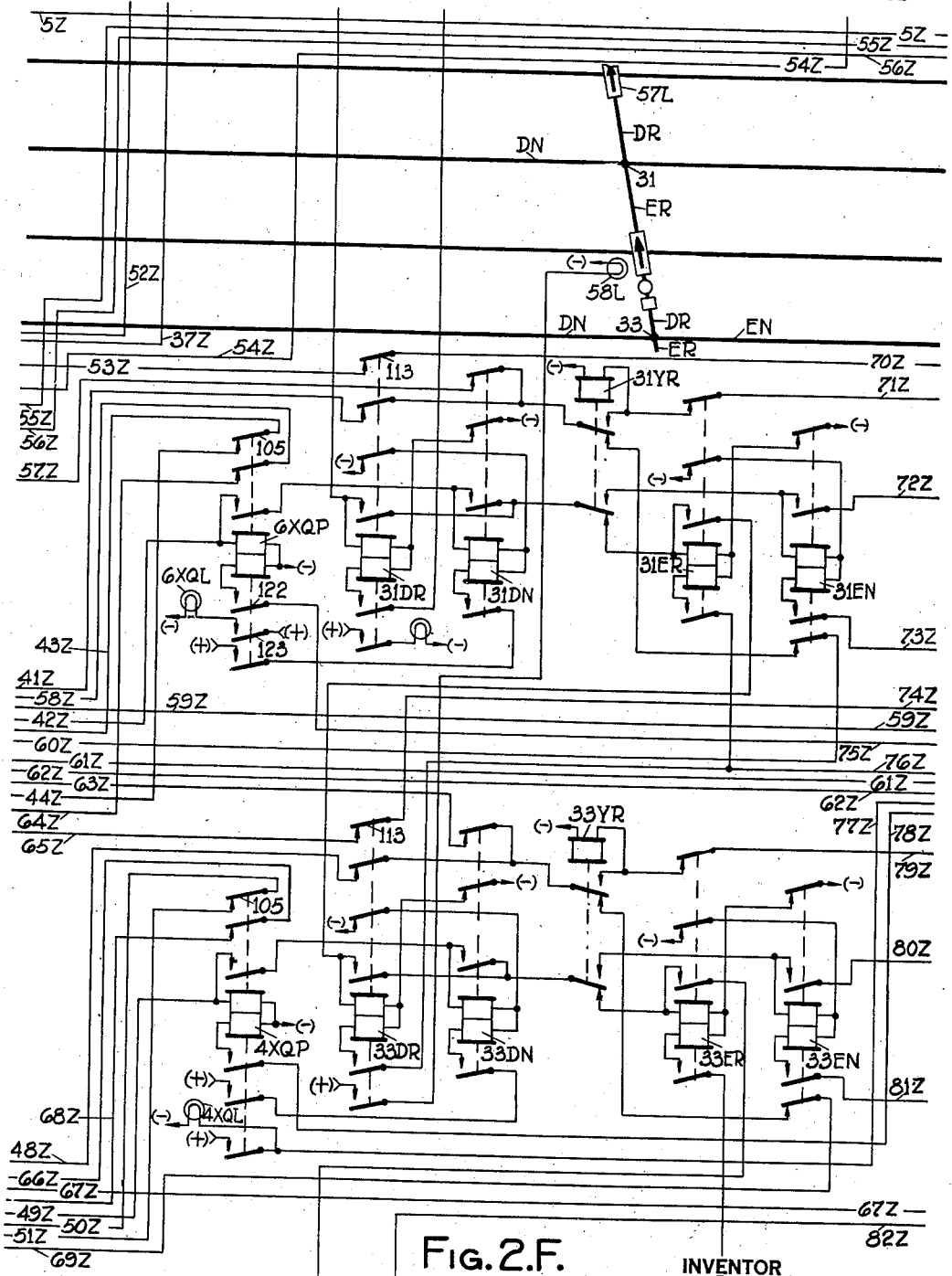
Fig. 2.F.

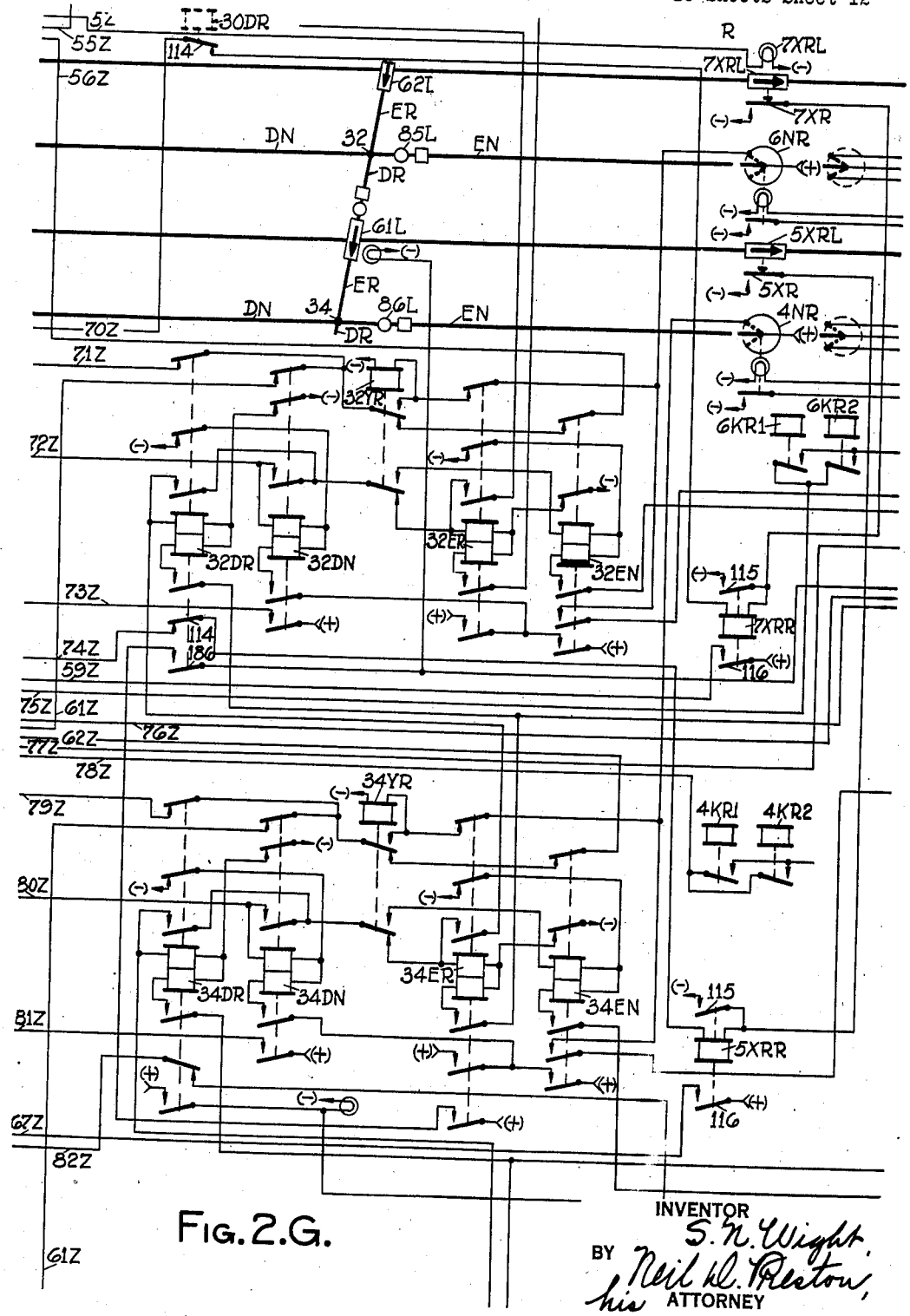

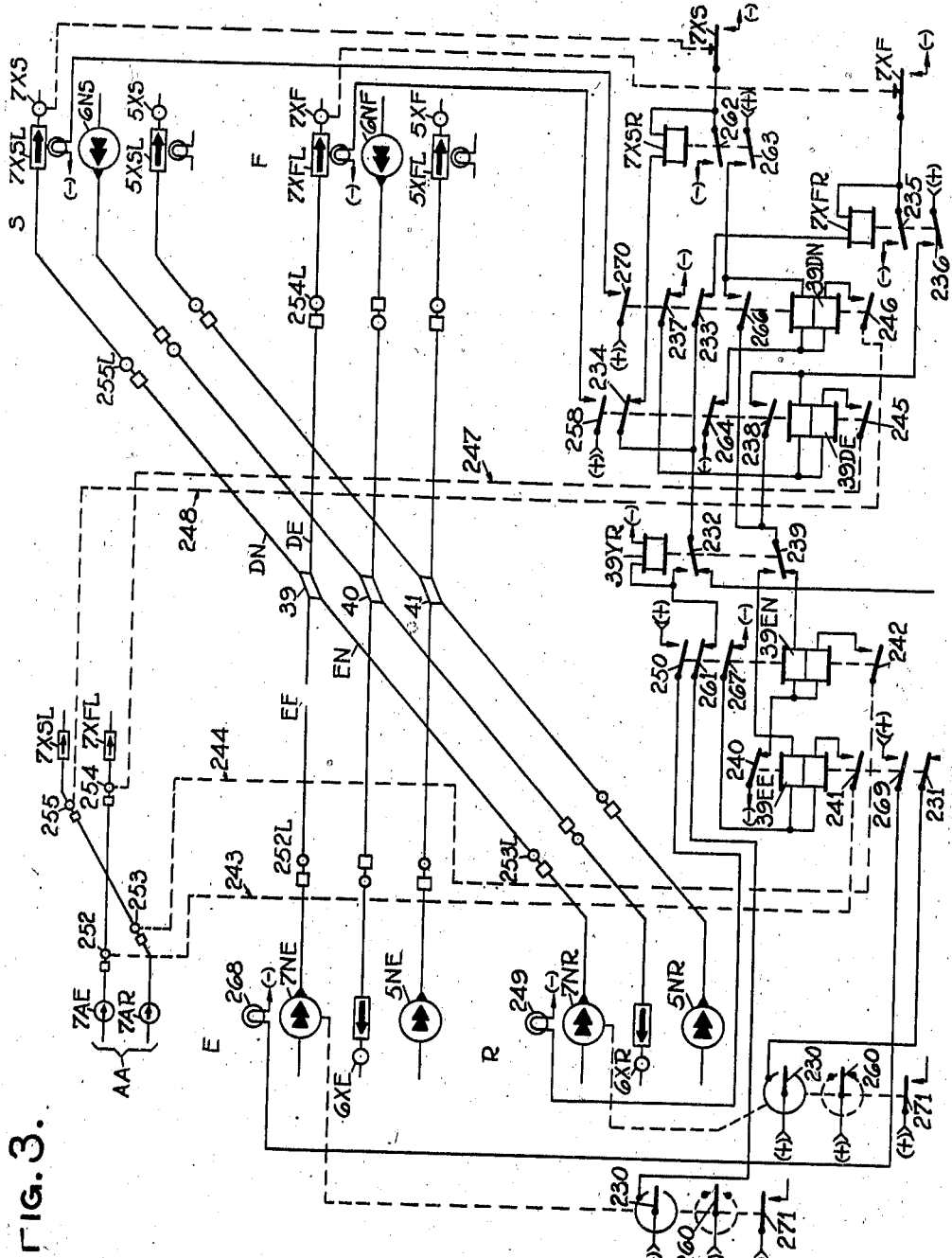

Patented Mar. 21, 1944

2,344,759

UNITED STATES PATENT OFFICE 2,344,759

AIRPLANE DISPATCHING SYSTEM

Sedgwick N. Wight, Rochester, N. Y., assignor to General Railway Signal Company, Rochester, N. Y.

Application February 24, 1942, Serial No. 432,121

18 Claims. (Cl. 177—353)

The present invention relates to airplane dispatching. The invention more particularly relates to apparatus for making a visual record of communicated instructions, acceptance of these instructions and the progress of planes over routes authorized by these instructions which apparatus includes electrically interlocked circuits to prevent the giving of conflicting instructions and to prevent the cancellation of accepted instructions.

Commercial passenger and mail transport planes under present practice fly over ground routes which are defined by radio beams which define the path of travel over the earth but do not in any way define the altitude at which the plane or planes may fly. These radio beams do not constitute part of the present invention except in that they are a necessary aid for blind flying, that is, flying in fog, for which the present airplane dispatching system has been particularly devised. For purposes of simplicity the present invention has only been shown applied to two different routes which extend primarily in an east-west direction and which routes cross each other at an intermediate location. In accordance with the present invention it is contemplated that all east-bound planes over both routes fly at odd altitudes of 3000, 5000, 7000 and 9000 foot elevations and which permit westbound planes to fly at even altitudes of 2000, 4000, 6000 and 8000 foot elevations. In addition to these altitudes it is proposed to allow, so called, free lance flying below a 2000 foot elevation and to allow similar free lance flying at stratosphere elevations above, say, an 18,000 foot elevation. Between the 9000 foot route illustrated and the 18,000 foot stratosphere elevation mentioned it is proposed to have additional even thousand foot elevations for west-bound flying and odd thousand foot elevations for east-bound flying which for convenience have not been illustrated in the drawings. The Civil Aeronautics Administration under the U. S. Department of Commerce has promulgated certain rules to be followed in commercial aviation, and these rules especially in the more congested sections of the United States require specific authority from the Civil Aeronautics Administration to fly commercial planes carrying passengers and mail over specific routes at specific altitudes. As already mentioned these routes are defined by radio beams insofar as their location on the earth's surface is concerned and one object of the present invention resides in the provision of panels defining the routes as well as the various altitudes in these routes, together with means for lighting lamps in those particular elevations of particular routes which have been authorized by the Airways Traffic Control office of the Civil Aeronautics Commission to be occupied by a particular transport company. This office is conveniently designated the ATC office.

Another object of the present invention resides in the provision of means whereby these indicating lamps may be lighted distinctively to indicate either "advance clearance" which signifies that a particular route through particular altitudes has been tentatively assigned by the ATC office to a particular air transport company and to light such lamps in a different distinctive manner to signify that "actual clearance" has been given to such particular air transport company over such particular route and altitude.

Another object of the present invention resides in the provision of means whereby if lamps have once been lighted to signify actual clearance by the ATC office such clearance cannot be cancelled by the ATC office but must be cancelled by the particular air transport company office for which actual clearance of such route has been given.

Another object of the present invention resides in the provision of other distinctive lamps on the panels of each of the various competing transport companies to signify that advance or actual clearance over a particular route or routes at particular altitudes has been given to a particular air transport company.

Another object of the present invention resides in the provision of plane progress lamps conveniently also called token lamps on the panels located both in the ATC office and in the offices of the various transport plane companies to indicate the progress of a particular plane at a particular altitude over a particular route, these lamps being controlled by an attendant in the office of the air transport company conveniently called airline office which has been authorized to fly a plane over such route or routes.

Another object of the present invention resides in the provision of electrically interlocked circuits which are so interlocked that if the attendant at the ATC office should attempt to give advance clearance over a route which is in conflict with a route over which either advance clearing or actual clearing has already been given it will prevent him from giving either "advance clearance" or "actual clearance" over the proposed route.

Another object of the present invention resides in the provision of timing means for removing the restriction, or interlocking feature, imposed on an initial portion of a route, a specific time after such route was reported occupied, as signified by the lighting of a lamp located in the ATC office by an attendant at the office of the transport plane company which has been authorized to travel over such particular route, such lamps preferably being located in the ATC office and in each of the air transport offices. This is considered safe because airplanes have a specific minimum speed limitation in order to maintain altitude and it may therefore be assumed that a plane has travelled a minimum specific distance in a particular time.

Another object of the present invention resides in the provision of means to render this interlocking feature at times, as under clear weather conditions, inactive.

Other objects, purposes and characteristic features of the present invention will be apparent from the description which follows when considered in the light of the accompanying drawings of which Figs. 1A, 1B and 1C illustrate the panel located in the ATC office of one particular route which is crossed by another route illustrated by a similar panel shown in Figs. 1D, 1A and 1E.

Figs. 2A, 2B, 2C, 2D, 2E, 2F and 2G illustrate the circuit wiring extending between the ATC office illustrated in Figs. 2C, 2D, 2E, 2F and 2G and the panels of the American Transport Company office illustrated in Fig. 2A and the panel at the Eastern Air Transport office illustrated in Fig. 2B for eastbound routes at elevations of 5000 and 7000 feet and for westbound elevations of 4000 and 6000 feet between check points Q and R illustrated in Fig. 1D of the drawings; and Fig. 3 illustrates the electrically interlocked circuits at the ATC office only for the point at which the two airplane routes cross each other, as illustrated in Fig. 1A, at the 7000 foot elevation, these circuits also illustrating that not only is this a crossing point of two routes but is a point at which a plane may change its travel from one route to another crossing the same, the circuits for controlling the corresponding lamps at the air transport company offices and circuits which show the manner in which the plane progress lamps or token lamps are controlled (see similar circuits in Figs. 2A, 2B and 2C) have for convenience been omitted.

Referring to Figs. 1A to 1E, inclusive, attention is directed to the multi-elevation airplane route illustrated in Figs. 1A, 1B and 1C which extends from check point C to check point J, with the provision of intermediate check points D, E, F, G, H and I. This route has been so laid out on the panel in the ATC office that check points D, G and J lend themselves to constitute airports, that is, at these points D, G and J, airplanes may actually rise from the ground and may descend to the ground or rise into the stratosphere or descend from the stratosphere, whereas between check points E and F, H and I airplanes may only fly at constant elevations.

The circuits associated with the apparatus located in the ATC office are of the entrance-exit type, that is, these circuits are so organized that by operating an entrance knob, button or lever at a particular check point and operating an exit knob, button or lever at the next check point circuits will be established to light lamps on the ATC panel which visually indicate a flight route extending from one elevation at the first check point to the same or a different elevation at the next check point. The entrance control knobs or buttons have been designated by the letter N with a suitable prefix number signifying the altitude of the route and having a suffix letter signifying the check point. Referring to Fig. 1A, for instance, the entrance knob 7NC signifies that this is the entrance knob for the 7000 foot altitude at the check point C, whereas the exit knob 5XD signifies that this is the exit point of a route terminating at check point D at the 5000 foot altitude. The entrance and exit knobs at other check points and other altitudes have been similarly designated.

In order to illustrate how the attendant in the ATC office may signify a particular route on his control panel, and also on the indication panels of the air transport companies which fly over such routes and which are fragmentarily shown in Figs. 2A and 2B, let us assume that he wishes to start an airplane at the airport located at check point D and that he wishes to continue the flight of this plane at a 7000 foot elevation at check point T on another route which crosses the route C to J. In order to set up this route to signify "advance clearance" he will operate the entering button 0NDE (signifying entrance of a plane at zero elevation at check point D in an easterly direction) followed by the depression of the exit knob or button 7XE. The operation of these two control buttons 0NDE and 7XE, in the order given, will cause the lamp in the entrance button 0NDE to be lighted and further will cause the ascending lamps 53L and 54L for the block from check point D to check point E to be lighted and further causes the exit lamp 7XEL to be lighted as shown in Fig. 1A. The attendant at the ATC office will next operate the entrance button 7NE (see Figs. 1A and 3) for east-west route and the exit button 7XS (see Fig. 1E) for the north-south portion of the crossing route, so that a route is established starting at check point E and ending at check point S for the 7000 foot elevation as is signified by the illumination of the lamp in the entrance button 7NE and by the illumination of the exit lamp 7XSL (Figs. 1A and 1E). The attendant at the ATC office will next operate the entrance button 7NS (see Fig. 1E) followed by the operation of the exit button 7XT. This will result in the illumination of the lamp in the entrance button 7NS and in the illumination of the exit lamp 7XTL.

In order to illustrate how another route may be set up at the same time over portions of the same radio beam but at a different altitude without conflict with the route just traced, let us assume that the attendant at the ATC office has been informed that there is a plane arriving at point Q (see Fig. 1D) at the 7000 foot elevation and that this plane desires to pass over the check point S. Since the crossing point 39 is already occupied at the 7000 foot altitude it would be impossible to set up a route extending to the check point S at the 7000 foot altitude by reason of interlocked circuits described hereinafter so that the attendant will be compelled to operate his buttons to allow travel of the plane under consideration over the crossing designated by points 37 to 44, inclusive, at a different altitude. In view of these circumstances the operator will operate the entrance knob 7NQ (Fig. 1D) and will follow this by the operation of the exit knob 5XR. The operation of these knobs 7NQ and 5XR will result in the illumination of the lamp in the entrance button 7NQ, the descending lamp 51L for the block Q—R and will result in the illumination of the exit lamp 5XRL. The attendant at the ATC office may now operate the entrance button 5NR and follow this by the operation of the exit button 5XS. The operation of these two buttons, providing no route in conflict has already been set up, will result in the illumination of the lamp in the entrance button 5NR and in the illumination of the exit lamp 5XSL. The operator may now, if he so desires, continue the flight of this plane, and give indications of its authorization, at the 5000 foot elevation in the block extending beyond check point T by operation of the entrance button 5NS (see Fig. 1E) followed by the operation of the exit button 3XT. The operation of these buttons 5NS and 3XT will result in the illumination of the lamp in the entrance button 5NS, the descending lamp 52L for the block S—T and in the illumination of the exit lamp 3XTL.

It may be pointed out at this time that the entrance knobs or buttons N are turn buttons which may be turned to a particular position to signify a particular transport company tentatively or actually authorized and the exit knobs X are spring return push buttons which may be depressed and released to perform the exit function, all in a manner as more fully apparent when the circuits illustrated in Fig. 2 are described hereinafter.

It may also be pointed out here that certain plane progress or token lamps illustrated by a circle, having adjacent thereto a token receptacle represented by a square, are employed. These token lamps on the board at the ATC office, as more fully described hereinafter, are controlled from the office of the transport companies and if desired the attendant at the ATC office may insert a token in the receptacle illustrated by a square to signify the particular plane which has been reported to be located at the particular point corresponding to the point where the token lamp illuminated is located. As illustrated these token lamps are located on horizontal portions of the route and are also located on descending and ascending portions of the route.

As more fully pointed out hereinafter if, for instance, the token lamp 70L for the block Q—R (see Fig. 1D) becomes lighted, in response to manipulation of control button 70 on the panel located in the transport office, the lamp in the entrance button 7NQ will be extinguished whereas the lamps 51L and 5XRL will remain lighted, all in a manner more specifically described hereinafter. Although this lamp in the entrance button 7NQ is extinguished this button 7NQ will not be available for allowing a second route entering at that point and altitude to be established until a predetermined time, measured by a suitable time element device described hereinafter, has elapsed. That is, the release is time delayed. Additional provision is made for successively extinguishing the ascending lamps, such as, 54L and 55L of block Q—R (see Fig. 1D) and such as the descending lamps 50L and 51L for the block Q—R illustrated in this same figure and located in the ATC office by suitable manually controlled push-and-pull buttons located in the air transport company offices. It therefore follows that these ascending and descending lamps as well as the entrance lamps and exit lamps are lighted by the attendant in the ATC office and are extinguished by the attendant in one of the air transport company offices.

Referring now to Fig. 2A of the drawings, it will be seen that the 4000, 5000, 6000 and 7000 foot altitudes for the block Q—R (see Fig. 1D) have been reproduced in the American Airline office designated by the letter AA and referring to Fig. 2B it will be seen that a similar panel has been illustrated in the Eastern Airline office, designated by the reference character EA, for the 4000, 5000, 6000 and 7000 foot altitudes for the route of the block Q—R. It is to be understood that the lamps illustrated in the entrance knobs in the ATC office (see entrance knob 7NQ of Fig. 1D) have been designated by reference characters, such as, 7AQ in the American Airline office of Fig. 2A and have been designated by reference characters, such as, 7EQ in the Eastern Airline office illustrated in Fig. 2B. The exit lamps such as 7XRL (see Fig. 2A) and the exit lamp 7XRL (see Fig. 2B) have been designated by the same reference character as has the exit lamp 7XRL in the ATC office (see Fig. 1D). Similarly, the plane progress indicating or token lamps, the ascending and the descending lamps in the air transport offices AA and EA (see Figs. 2A and 2B) have been designated by the same reference characters as has been applied to similar token lamps and ascending lamps and descending lamps on the panels in the ATC office (see Fig. 1D). The token lamps illustrated in the airline offices AA and EA (see Figs. 2A and 2B) are located within push-and-pull buttons such as push-and-pull button 72 for the token lamp 72L (see Figs. 2A and 2B). These push-and-pull buttons if pushed in will be retained in that position and if pulled out will be retained in such position.

Figs. 1A, 1B and 1C should be laid end to end in that order with Fig. 1D laid below Fig. 1A and Fig. 1E laid above Fig. 1A to constitute a drawing of the panel located at the ATC office and these will hereinafter collectively be referred to as Fig. 1. Referring to Fig. 1 the entrance buttons, such as entrance button 7NQ (see Fig. 1D), are combined rotary and push buttons which are provided with a light in the knob thereof, the rotary contacts being shown in Fig. 2D and being designated by the reference characters 45 and 46 and the push contact being designated by the reference character 47. The exit button (see Fig. 2G) is a spring return push button and for the same straight through route at 7000 feet elevation in the block Q—R in Fig. 2G of the drawings has been designated 7XR (see also Fig. 1D).

For simplicity the circuits for controlling between the 3000 foot elevation and the 8000 foot elevation of the block Q—R (see Fig. 1D) only have been illustrated in Figs. 2C, 2D, 2E, 2F and 2G it being understood that the circuits for similar apparatus, since they are identical and have for convenience been omitted, need not be illustrated. Referring again to Fig. 1D the sloping substantially vertical lines in this figure show by the illumination of lamps that a particular plane is to change its altitude, the plane lowering its altitude if the arrows point downwardly and increasing its altitude if the arrows point upwardly. The rectangles shown in the sloping vertical lines and containing arrows signify lamps which have been identified by the reference characters 50L, 51L, 52L, 53L, 54L, 55L, 56L, 57L, 58L, 59L, 60L, 61L, 62L and 63L. These lamps are located at points where a plane flying in one direction is making an ascent or a descent when crossing a route for planes flying in the opposite direction. In other words, these locations, such as the location of lamp 50L, show a crossing point of two routes, whereas the crossing points illustrated by heavy dots 21, 22, 23, 24, 25, 26, 27, 28, 29, 30, 31, 32, 33, 34, 35 and 36 illustrate crossing points of air routes for planes flying in one particular direction only and therefore constitute not only crossing points but constitute points where a plane may change from a horizontal direction of movement into an ascending or descending route or may move from an ascending or descending route into a horizontal route. In order to clearly disclose the relationship of the various relays to the routes, that portion of the diagram illustrated in Fig. 1D containing converging-diverging route elements designated by points 23, 24, 25, 26, 31, 32, 33 and 34 have been illustrated by heavy lines in Fig. 2. It may be pointed out here that Fig. 2 constitutes Figs. 2A and 2B laid under each other with Figs. 2C, 2D, 2E, 2F and 2G laid side by side in that order to the right of Figs. 2A and 2B.

Referring now to Fig 2 it will be seen that each of the converging-diverging points 23, 24, 25, 26, 31, 32, 33 and 34 has suitable reference characters applied to the route portions converging to such point and diverging from such point. For convenience the converging or entering route portions have been designated EN and ER where the reference character E represents "entering," the reference character "N" represents "normal" (horizontal), and the letter "R" represents "reverse" (meaning inclining or declining). The diverging route portions have been designated DN and DR, the letter "D" meaning departing so that these reference characters signify departing normal and departing reverse, respectively, the letter "N" again signifying horizontal and the letter "R" signifying reverse, that is, ascending or descending.

The entrance-exit type of network employed in the present invention requires a special relay for each converging point which, for convenience, has been designated YR with a prefix corresponding to the point at which it is located. In addition to the relay 23YR for point 23 there is provided for each of the route portions a relay designated by the reference character of that route portion which is preceded by a prefix corresponding to the point at which the relay is located. In other words, these relays have been designated 23EN, 23ER, 23DN and 23DR. Similar relays are provided for each of the converging-diverging points 24, 25, 26, 31, 32 33 and 34, and these relays are preferably interconnected as illustrated in Figs. 2D, 2E, 2F and 2G of the drawings. In addition to these relays there is provided an exit relay designated 7XRR for the exit point containing push button 7XR, similarly designated relays being provided for other exit points. For each exit relay, such as 7XRR, there is provided an exit repeater relay such as 7XRP.

Each entrance button, such as entrance button 7NQ, is provided with a timing relay TR, an advance clearance relay GR and a final clearance relay CR, each reference character of which is preceded by a prefix corresponding to the prefix associated with such entrance button. The timing relay TR is of a construction so that when deenergized its contacts will immediately assume the open position and which if reenergized will not reclose these contacts until after the expiration of a predetermined period of time which may, for instance, be ten minutes. This period of time is selected in accordance with local conditions such as the speed of the planes employed, the density of traffic and the like, the purpose of this timing device being to prevent a second plane from following a first plane over a particular route less than a safe distance determined by the period of time between plane starting presumed to be ten minutes for the system under consideration.

Each of the entrance buttons is provided with an AP relay and an EP relay in the particular construction illustrated, it being assumed that the ATC office illustrated in Fig. 2C–2G is connected only to two air transport companies, such as the American Airline office illustrated in Fig. 2A, and the Eastern Airline office illustrated in Fig. 2B. That is, only these two transport companies fly over the routes illustrated. The relay 7AP is more particularly associated with the American Airline office, whereas the relay 7EP is more particularly associated with the Eastern Airline office. These relays AP and EP are controlled by the contact 46 of the associated entrance button. In other words, the entrance button 7NQ through the medium of its contact 46 controls the relays 7AP and 7EP, there being similar relays for the contact 46 of other entrance buttons, some of which have not been illustrated in the drawings.

In each of the air transport offices is provided a similar panel to the panel illustrated for the ATC office in Fig. 2D–2G, but for convenience only a small portion of each of these panels has been illustrated in Figs. 2A and 2B, respectively. The portion of these panels illustrated in Figs. 2A and 2B is that portion of these panels which represents the air traffic route in the block Q—R for the altitudes of 4000, 5000, 6000 and 7000 feet and also the portions representing the ascending and descending routes associated therewith. In place of the entrance button 7NQ illustrated in Fig. 2D of the drawings there is provided a lamp designated 7AQ for the American Airline office in Fig. 2A of the drawings and a lamp 7EQ for the Eastern Airline office illustrated in Fig. 2B of the drawings. The exit lamp for each route, such as the exit lamp 7XRL in Fig. 2G of the drawings has been illustrated in a like manner and has been designated by the same reference character 7XRL at both the American Airline office illustrated in Fig. 2A and the Eastern Airline office illustrated in Fig. 2B.

Similarly, the lamps for descending routes and designated 51L and 52L in Fig. 2D of the drawings have been reproduced on the panels in the American Airline office and the Eastern Airline office by a similar conventional showing and designated by the same reference characters 51L and 52L in both Figs. 2A and 2B of the drawings. Similar lamps being provided for other ascending and descending routes. Also, the converging-diverging route points 23, 24, 25, 26, 31, 32, 33 and 34 illustrated in Fig. 1D of the drawings and also illustrated in Figs. 2D–2G of the drawings have also been illustrated and similarly designated in Figs. 2A and 2B of the drawings.

It may be pointed out at this time that the entrance lights, the exit lights, and the ascending and descending lights illustrated by arrows in each of the three offices (ATC office, American Airline office, and Eastern Airline office), are controlled from the ATC office illustrated in Figs. 2C–2G, whereas the token lights or plane progress lights, such as 70L, 72L, 73L, 78L, 79L, 80L, 81L, 85L, 86L and 93L illustrated in Figs. 1D, 2A, 2B, 2D, 2E, 2F and 2G are controlled from the air transport offices illustrated in Figs. 2A and 2B. In fact, as illustrated these token lamps constitute push-and-pull contact controlling buttons which for the lamp 72L has been designated 72, and which control relays KA, which for the token lamp 72L and the push-and-pull button 72 have been designated 72KA1 and 72KA2, there being similar relays for each of the other token push-and-pull buttons for the American Airlines office shown in Fig. 2A and similarly the buttons for the Eastern Airline office shown in Fig. 2B have been assigned like reference characters except for the substitution of the letter "E" for the letter "A." The token lamps, such as, 72L, 73L and 93L just mentioned, are associated with ascending and descending route portions, whereas token lamps 70L, 74L, 78L, 79L, 80L and 81L are associated with horizontal air routes. It should be noted that the token relays KA and KE control token repeater relays designated KR and KP located in the ATC office. The relay 7KR1 (see Fig. 2C) located in the ATC office may be controlled by either the token relays 78KA1 and 78KA2 located at the American Airline office (see Fig. 2A) or may be controlled by the token relays 78KE1 and 78KE2 located in the Eastern Airline office illustrated in Fig. 2B. Other token repeater relays KR are controlled in a similar manner. The token repeating relay 72KP, for instance, may be controlled through the medium of the push-and-pull button 72 and relays 72KA1 and 72KA2 shown in Fig. 2A or may be controlled by the push-and-pull button 72 and the token relays 72KE1 and 72KE2 illustrated in Fig. 2B. Other KP relays are controlled in a similar manner.

Each of the KR relays and KP relays illustrated in Fig. 2C is provided with a repeater relay of the double winding neutral type which has been designated M. The letter "M" signifying momentary deenergization. These relays M are neutral relays but are provided with two windings which are so connected in the circuit as to polarity that one of these windings when energized magnetizes the magnetic structure of the relay in one direction, whereas the other winding when energized magnetizes this structure to the opposite magnetic polarity. One of these windings is energized when the associated KR or KP relay is energized, whereas the other winding is energized when such relay KR or KP is in its deenergized position. The obvious result which follows is that for each picking up and each dropping of a KR relay or a KP relay its associated M relay is energized by current of the opposite polarity to that which it was previously energized so that the magnetism in its magnetic structure must pass through zero as a result of which the front contact of the M relay is momentarily opened for each change in the position of an associated KR relay or KP relay. This structure is resorted to to cause momentary opening of a circuit for the purpose of dropping stick relays under certain conditions, all in a manner as more specifically pointed out hereinafter.

In the American Airline office illustrated in Fig. 2A there are also provided repeater relays for the exit repeater relays 7XRP and 5XRP illustrated in Fig. 2E of the drawings, these repeater relays have been designated 7XRPA and 5XRPA, respectively, there being similar relays 7XRPE and 5XRPE for the panel of the Eastern Airline office illustrated in Fig. 2B. These relays 7XRPA and 7XRPE directly repeat the relay 7XRP shown in Fig. 2E, whereas the relays 5XRPA and 5XRPE shown in Figs. 2A and 2B, respectively, directly repeat the exit repeater relay 5XRP illustrated in Fig. 2E of the drawings.

Also, the condition of energization of the relays 23DR and 25ER illustrated in Fig. 2D of the drawings is repeated in the American and Eastern Airline offices, respectively, by the relays 7DRPA in the American Airline office illustrated in Fig. 2A and by the relay 7DRPE in the Eastern Airline office illustrated in Fig. 2B. In a similar manner, energization of the relays 25DR illustrated in Fig. 2D and the relay 27ER (not shown) is repeated in the American Airline office by the repeater relay 5DRPA (see Fig. 2A) and is repeated into the Eastern Airline office by the relay 5DRPE (see Fig. 2B). Each of these relays 7DRPA and 5DRPA of Fig. 2A and 7DRPE and 5DRPE of Fig. 2B when energized signify that a descending route has been set up at points corresponding to these relays by the control apparatus in the ATC office illustrated in Figs. 2C–2G.

Some of the indicating lamps for the main control panel in the ATC office illustrated in Figs. 2C–2G as well as some of the lamps illustrated in the American Airline office in Fig. 2A and on the panel for the Eastern Airline office illustrated in Fig. 2B are at times energized by steady light to give continuous illumination and are at other times energized intermittently to produce flashing illumination of these lamps. In order to illustrate interrupted energy as distinguished from the steady energy the legends flashing and steady have been applied to the tail ends of suitable arrows illustrating a source of current in Figs. 2A, 2B and 2C of the drawings.

As already mentioned the circuits for controlling the indicating lamps both on the ATC board shown in Figs. 2D–2G and on the two transport company boards shown in Figs. 2A and 2B, respectively, are so interlocked that a second route in conflict with an already authorized route cannot be set up. This interlocking feature is proposed to be effective only when the apparatus is operated under instrument flight rules. In this connection it may be pointed out that commercial airplanes fly under two sets of rules, namely, "instrument flight rules" and "contact flight rules." By instrument flight rules is meant rules that are considered safe under blind flying conditions, such as night flying, and flying in conditions of severe fog. By "contact flight rules" is meant rules that prevail when vision is sufficiently good to assure a pilot following the radio beam against colliding with another plane. In order to have the apparatus disclosed function under these two flight rules conditions a lever 95 (see Fig. 2E) is provided in the ATC office which is normally, as illustrated, assuming the "instrument" flight rule position with the contact associated therewith open. If this lever is moved to the "contact" flight rule position an energizing circuit for the relay FCR is closed by this contact. With relay FCR energized energy is removed from all ER and DR relay stick circuits by the opening of back contact 96 of this relay FCR (see Fig. 2C). Also, with this relay FCR energized the timing relays, such as 7TR and 5TR are held permanently energized through the medium of front contacts 96 and 97 of this relay FCR. Furthermore, with this relay FCR energized repeater relays FCRPA (see Fig. 2A) and relay FCRPE (see Fig. 2B) are energized through front contact 98 of relay FCR. These relays FCRPA and FCRPE are located in the offices of the American Airline office and the Eastern Airline office, respectively. The instrument flight rule lamps 66 controlled by the relays FCRPA and FCRPE, are normally energized through back contacts 67 of these relays and upon movement of the lever 95 in the ATC office to its contact flight rule position these indicating lamps 66 in the air transport offices are extinguished and in place thereof the contact flight rule lamp 79 is energized. In order to get a better understanding of the entire system, and particularly the entrance-exit type interlocked circuits, operation of a portion of the system will now be discussed.

Operation

Let us assume that the attendant at the ATC office shown in Figs. 1D, 2D, 2E, 2F and 2G is operating under instrument flight conditions, that is, the lever 95 (see Fig. 2E) assumes its right-hand position and that the attendant intends to set up a flight route starting at the 7000 foot elevation at check point Q and terminating at a 5000 foot elevation at check point R as illustrated by lighted lamps in Fig. 1D of the drawings. Let us further assume that this route is to be used by the American Airlines Company rather than by the Eastern Airlines Company, the panels of which are shown in Figs. 2A and 2B, respectively. In order to set up this route the operator will turn his entrance button 7NQ (see Fig. 2D) toward the left as indicated by the arrow point projecting from this button in Fig. 1D of the drawings. This turning of the entrance button 7NQ causes closure of a circuit at one point by contact 46 and causes closure of a circuit for the relay 23YR at contact 45 (see Fig. 2D). The completion of this last mentioned circuit through back contact 100 of relay 23ER energizes the relay 23YR and establishes two circuits beyond the contact 101 of relay 23YR.

The first of these circuits extends through front contact 101 of relay 23YR through back contact 102 of relay 23DR, wire 38Z, and back contact 103 of relay 24ER to the winding of relay 24YR, whereas the other circuit extends through front contact 101 of the relay 23YR through back contact 104 of relay 23DN, wire 43Z, back contact 105 of relay 6XQP, wire 44Z, through back contact 106 of relay 25EN, through back contact 101 of relay 25YR, through back contact 102 of relay 25DR, wire 45Z, and back contact 103 of relay 26ER, through the winding of relay 26YR, as a result of which both of the relays 24YR and 26YR are energized and picked up. The picking up of relays 24YR and 26YR establish new circuits through front contacts 110 of relays 24YR and 26YR and wires 52Z, 53Z, 64Z and 65Z extending to associated exit relays 7XRR and 5XRR. It is thus readily seen that either the exit relay 7XRR or the exit relay 5XRR may be energized by depression of the respective exit buttons 7XR and 5XR. Since the route proposed to be set up starts at the entrance button 7NQ and ends at the exit button 5XR (see lighted lamps in Fig. 1D) the exit button 5XR will now be assumed to be depressed.

Depression of the exit button 5XR (see Fig. 2G) will cause the circuit heretofore traced up to and including the front contact 110 of relay 26YR to be continued through back contact 112 of relay 26DR, wire 65Z, through back contact 113 of relay 33DR, wire 74Z, through back contact 114 of relay 32DR, through the winding of the relay 5XRR, and exit push button contact 5XR to the terminal (−) of the same source of current, the terminal (+) of which is connected to the contact 45 of the entrance button 7NQ. The completion of this circuit will, of course, cause the exit relay 5XRR to pick up to close its stick contact 115 and its front contact 116. The closure of the stick contact 115 closes a stick circuit for the relay 5XRR so that the exit push button 5XR may be released.

Closure of the front contact 116 of relay 5XRR closes an energizing circuit for the exit repeater relay 5XRP through wire 67Z resulting in the picking up of this latter relay. With the exit repeater relay 5XRP now picked up the following stick circuit is closed to maintain this exit repeater relay 5XRP energized: beginning at the terminal (+), back contact 96 of the relay FCR (see top of Fig. 2C), front contact 120 of the relay M associated with the relay 5KR2, front contact 121 of the relay M associated with the relay 5KR1, the contacts 120 and 121 having in multiple therewith front contacts 118 and 117 of relays 5XR2 and 5XR1 in multiple, wire 34Z, and stick contact 122 included in series with the winding of the relay 5XRP and to the other terminal (−) of the same source. Also, with the repeater stick relay 5XRP now energized the lamp 5XRL (see Figs. 1D and 2E) is energized through front contact 123 of the relay 5XRP. This contact 123 also closes an energizing circuit including wire 7Z for the relays 5XRPA and 5XRPE (see Figs. 2A and 2B, respectively) which in turn through the medium of their front contacts 124 close energizing circuits for the exit lamps 5XRL shown in Figs. 2A and 2B, respectively.

With the exit repeater relay 5XRP (Fig. 2E) now energized and maintained energized by a stick circuit the closure of its front contact 126 closes an energizing circuit for the departing normal relay 26DN including back contact 127 of the relay 26DR. The closure of this circuit results in the energization of the departing normal relay 26DN which through the medium of its front contact 128 now closes an energizing circuit for the entering normal relay 26EN including the front contact 129 of relay 26YR and back contact 130 of entering reverse relay 26ER. With the entering normal relay 26EN now picked up an energizing circuit for the departing normal relay 25DN including the front contact 131 of entering normal relay 26EN, wire 46Z, and back contact 132 of the departing reverse relay 25DR, is closed. The picking up of the departing normal relay 25DN by closure of its front contact 133 closes an energizing circuit for the entering reverse relay 25ER including back contact 134 of relay 25YR and back contact 135 of entering normal relay 25EN. The picking up of the entering reverse relay 25ER through the medium of its front contact 136 closes an energizing circuit for the departing reverse relay 23DR including the back contact 137 of the departing normal relay 23DN. The picking up of the departing reverse relay 23DR through the medium of its front contact 138 closes an energizing circuit for the entering normal relay 23EN including the front contact 134 of relay 23YR and back contact 140 of the entering reverse relay 23ER.

The picking up of the departing reverse relay 23DR also at its back contact 102 interrupts the energizing circuit including wire 38Z for the relay 24YR so as to remove energy from one terminal of the exit relay 7XRR so that depression of the exit button 7XR will no longer produce any result. In a similar manner, the picking up of the exit repeater relay 5XRP by the opening of its back contacts 141 and 142 has broken certain interlocked circuits including wires 60Z, 61Z, 62Z and 63Z to prevent conflicting airplane routes for west-bound plane movement being visually established. Also, the picking up of the departing normal relay 26DN by the opening of its back contact 143 in wire 64Z prevents a conflicting route for east-bound plane movement being set up. The picking up of the departing normal relay 25DN by the opening of its back contact 104 in wire 50Z prevents the establishment of a conflicting route visually on the boards at the ATC office and at the two air transport offices. The picking up of the reverse entering relay 25ER by the opening of its back contact 100 prevents the relay 25YR being picked up by the entering knob 5NQ from which it is apparent that no route originating at the entrance knob 5NQ can be visually established on the panel. Also, the picking up of the entering normal relay 23EN by the opening of its back contact 106 in wire 37Z interrupts a circuit for another conflicting route starting at a point signifying a higher altitude for east-bound flying.

The relays 5XRP, 26DN, 26EN, 25DN, 25ER, 23DR and 23EN are now energized, for each of these relays except the last mentioned one there is provided a stick circuit of which the closed stick circuit for the relay 5XRP has already been traced. Each of the stick circuits for exit repeater relays, such as relay 5XRP, is normally closed at all points except at the stick contact. The departing normal relay 26DN has its stick circuit including its stick contact 150 closed at front contact 151 of the exit repeater relay 5XRP. In a similar manner the entering normal relay 26EN has its stick circuit including stick contact 152 closed through wire 47Z at front contact 153 of the departing normal relay 25DN, and similarly the departing normal relay 25DN has its stick circuit including its stick contact 154 closed at front contact 155 of the entering reverse relay 25ER, and in multiple therewith by the front contact 177 of the entrance-normal relay 25EN if this latter relay were up. The relay 25EN does not have its stick circuit including wire 36Z and back contact 170 of timing relay 5TR closed for two reasons, first, because its stick contact 183 is open, and secondly, because the timing relay 5TR assumes its energized position. The departing reverse relay 23DR and the entering reverse relay 25ER have their stick circuits including stick contacts 166 and 167 and wire 32Z closed at front contact 168 of the relay M associated with the relay 72KP and at front contact 169 of such relay 72KP in multiple therewith (see Fig. 2C) and also including back contact 96 of the relay FCR in series therewith. From this latter stick circuit it is readily seen that picking up of the relay 72KP as, for instance, by the depression of the button 72 in the American Airline office illustrated in Fig. 2A, will cause the stick circuit to be shifted from the front contact 168 to the front contact 169 of the relay 72KP without opening of the stick circuit. It is also readily seen that upon deenergization of the relay 72KP due to the pulling out of this button 72 its front contact 169 will be opened followed by momentary opening of the front contact 168 of the associated M relay. This momentary opening of the contact 168 of the relay M due to dropping of the relay 72KP will cause momentary opening of the stick circuit for the relays 23DR and 25ER and the dropping of these relays. The latter of which when dropped will open the stick circuit for the relay 25DN, which by dropping will open the stick circuit for the relay 26EN. It may be pointed out here that the entering normal relay 23EN is provided with a somewhat different stick circuit and this relay would drop as soon as its pick-up circuit including the contact 45 of the entrance button 7NQ and the indirect stick circuit including the front contact 160 of the final clearance relay 7CR are both opened. Since, however, the entering normal relay 23EN is slightly slow dropping, as conventionally shown, its stick circuit including stick contact 183 and back contact 170 of timing relay will be closed before this relay 23EN begins to drop. The energization of these various entrance and exit relays will cause the indicating lamps 51L and 5XRL (see Figs. 1D, 2D and 2G) to be lighted, the lamp 51L in the ATC office being lighted through a circuit including front contact 186 of the relay 23DR and contact 187 of relay 25ER in series whereas the relays 7DRPA and 7DRPE in offices AA and EA are energized through these same contacts and wire 4Z, (see Fig. 2D). Also, the exit light 5XRL in the ATC office is energized through a circuit including the front contact 123 of the exit repeater relay 5XRP (see Fig. 2E), whereas relays 5XRPA and 5XRPE in offices AA and EA are energized through this same contact 123 and wire 7Z.

With the entering normal relay 23EN now energized in a manner as just described its closed front contact 163 estabishes an energizing circuit through wire 29Z for the advance clearance relay 7GR (see Fig. 2C). With this advance clearance relay 7GR now assuming its energized position its closed contact 224 completes an energizing circuit through wire 21Z for the lamp 225 located in the entrance button 7NQ and causes it to be lighted through a circuit energized by steady current and including back contact 226 of the final clearance relay 7CR and the front contact 227 of the timing relay 7TR (see Fig. 2C), so that the entrance knob 7NQ appears illuminated as illustrated in Fig. 1D of the drawings. The lamps 225 located in button 7NQ and the lamps 51L and 5XRL are now lighted, as conventionally shown in Fig. 1D of the drawings, thereby informing the attendant at the ATC office that he has tentatively assigned this route to a particular air transport company which in practice is called the giving of advance clearance.

Let us now observe how such advance clearance is distinctively indicated in the two air transport offices illustrated in Figs. 2A and 2B, respectively. With the entrance button for the 7000 foot elevation between check points Q and R moved to its upper position (see Fig. 2D) the closed contact 46 establishes an energizing circuit for the relay 7AP which circuit may be traced as follows: beginning at the terminal (+) of a suitable source of current, front contact 170 of the timing relay 7TR, front contact 171 of the advance clearance relay 7GR, wire 19Z, contact 46 of the entrance button 7NQ, wire 18Z, winding of the relay 7AP, through back contact 172 of the relay 7EP, to the terminal (−) of the same source of current. The closure of this circuit will result in the picking up of the relay 7AP and in the energization of a circuit for the relay 7AR located in the American Airline office illustrated in Fig. 2A by current of positive polarity through the front contact 173 of the relay 7AP and wire 8ZA. It will also result in the energization of a circuit by current of negative polarity for the relay 7ER located in the Eastern Airline office illustrated in Fig. 2B of the drawings through the medium of contact 174 of the relay 7AP and wire 8ZE. The opposite terminal of each of these relays 7AR and 7ER is connected to a common return wire C (not shown) connected to the mid-point of the same battery or other source of current. The energization of these relays 7AR and 7ER by current of positive and negative polarity respectively causes the polar contacts 180 of these respective relays to be operated to the right-hand and left-hand positions, respectively. This causes the lamps located back of the bull's eyes 7AQ and 7EQ to be illuminated red and amber, respectively, as illustrated by the reference characters R and A. The energizing circuit for the red lamp back of the bull's eye 7AQ may be traced through a circuit including back contact 178 of relay 7CPA, front contact 179 of relay 7AR, polar contact 180 of this same relay 7AR, and the red indicating lamp R located back of the bull's eye 7AQ.

Similarly, the amber light A under the bull's eye 7EQ illustrated in Fig. 2B of the drawings will be lighted through a circuit which may be traced from steady energy through back contact 178 of relay 7CPE, front contact 179 of relay 7ER, polar contact 180 of relay 7ER, and the amber lamp A under the bull's eye 7EQ, to the other terminal (−) of the same source of current. The lighting of the red lamp R under bull's eye 7AQ at the American Airline office (see Fig. 2A) and the lighting of the amber lamp A under the bull's eye 7EQ at the Eastern Airline office (see Fig. 2B) inform the attendants at these offices that a particular route starting at this point has been tentatively set up to be used by the American Airline office and not to be used by the Eastern Airline office. Similarly, the lamps 51L at both the American Airline office of Fig. 2A and at the Eastern Airline office shown in Fig. 2B will be lighted through front contacts 184 of relay 7DRPA and 184 of relay 7DRPE, respectively, and these relays 7DRPA and 7DRPE are energized over separate line circuits from the ATC office through front contacts 186 and 187 of the relays 23DR and 25ER arranged in series. The circuit for the lamp 51L (Fig. 2D) also passes through these contacts 186 and 187 in series. As already pointed out the exit lamps 5XRL shown on the panels in both the American Airline office and the Eastern Airline office (Figs. 2A and 2B) are also lighted, so that the route from the entrance point 7AQ to the exist point 5XRL on both of the panels illustrated in Figs. 2A and 2B, respectively, are lighted to illustrate the route tentatively set up, that is, indicating advance clearance of a proposed route. These lamps are lighted through front contacts 124 of relays 5XRPA and 5XRPE, respectively, which relays are controlled through a front contact 123 of relay 5XRP (see Fig. 2E) through wire 7Z.

Let us now assume that the dispatcher at the American Airline office is ready to have a plane take the route over which advance clearance has been authorized for this particular company, namely, the route starting at point 7AQ (Fig. 2A) and ending at point 5XRL, and that this dispatcher by telephone or radio communication gets in touch with the attendant at the ATC office and informs him that the route is ready to be occupied by a plane which is about ready to enter the check point Q at an elevation of the 7000 feet.

In response to this telephone or radio communication the attendant at the ATC office, if he is now willing to give final clearance over this route to the American Airline office, will depress the entrance button 7NQ to close the push contact 47 of this entrance button momentarily. The momentary closure of this contact 47 of entrance button 7NQ closes a pick-up circuit for the final clearance relay 7CR momentarily which may be traced as follows: beginning at the terminal (+) of a suitable source of current, back contact 190 of the relay 7KR2, back contact 191 of the relay 7KR1 in multiple with front contact 192 of the M relay associated with relay 7KR2 and front contact 193 of the relay M associated with the relay 7KR1 in series, then through front contact 194 of the timing relay 7TR, front contact 195 of the advance clearance relay 7GR, through the winding of the final clearance relay 7CR, through wire 22Z and contact 47 of the entrance button 7NQ, to the other terminal (−) of the same source of current. This will, of course, result in the picking up of the final clearance relay 7CR and in the closure of its stick contact 196 and the closure of a stick circuit for this relay 7CR. The relay 7CR will, therefore, remain up in spite of the return of the push contact 47 of the entrance button 7NQ to its normal position. The picking up of the final clearance relay 7CR will open the steady energizing circuit for the lamp 225 (see Figs. 2C and 2D) and will in place thereof close a circuit to flashing energy as is evident by the legend "Flashing" at the front contact 226 of the relay 7CR. Also, the picking up of the final clearance relay 7CR will close a stick circuit for the advance clearance relay 7GR which includes the stick contact 198 of relay 7GR and the front contact 199 of the relay 7CR. Also, with the final clearance relay 7CR now energized its front contact 160 through wire 23Z will supply energy to the stationary portion of the rotary contact 45 of the entrance button 7NQ, so that if the attendant at the ATC office should return his entrance knob to its normal position it would not cause deenergization of any of the relays 23YR, 25YR, 23EN, 23DR, 25ER, 25DN, 26EN, 26DN, 5XRR and 5XRP that were formerly picked up in response to the rotary operation of the entrance button 7NQ. Furthermore, with the relay 7CR now picked up and stuck up and with its front contact 200 closed energizing circuits for the repeater relays 7CPA and 7CPE located in the American Airline office and the Eastern Airline office, respectively, are closed through wire 3Z, to thereby cause the steadily lighted red lamp in the American Airline office and steadily lighted amber lamp in the Eastern Airline office located under the bull's eye 7AQ and 7EQ, respectively, to be changed to flashing lights to inform the dispatcher at the American Airline office that he may start his plane on the designated route and informing the dispatcher in the Eastern Airline office that the route over which advance clearance was formerly given has now been turned over for use by the American Airline Company.

If the attendant in the ATC office should in the meantime return his rotary entrance button 7NQ to its normal position, the lights R and A under the bull's eyes 7AQ and 7 EQ (Figs. 2A and 2B) would be extinguished but the light 225 associated with the entrance knob (Fig. 2D) would remain lighted. The rotary entrance button 7NQ therefore should not yet be returned to its normal position. Let us now assume that the dispatcher in the American Airline office has authorized by radio telephone the pilot of the eastwardly moving plane approaching at the 7000 foot level to proceed at the 7000 foot altitude until he has passed the check point Q and that he must thereafter reduce his altitude to the 5000 foot level. Let us now assume that the pilot of the airplane has reached the check point Q and that he communicates with the dispatcher of the American Airline office and advises him of this fact. In response to this information the dispatcher at the American Airline office will depress the push-and-pull button 70 to result in the illumination of the red lamp R through back contacts 201 and 202 of the relays 70KA2 and 70KA1, respectively. This is true because depression of the push-and-pull button 70 results in deenergization of the relay 70KA2. Also, with the push button 70 of the American Airline office depressed current may flow through the back contact of this push button 70, through back contact 203 of the relay 70KA2, through wire 1Z, front contact 203 of the relay 70KE2 (see Fig. 2B) to result in the energization and picking up of the relay 70KE1. It should be noted that with relay 70KE2 once picked up it cannot be caused to drop by opening the normally closed contact 70, because relay 70KE2 is then stuck up by a stick circuit including front contact 205 of relay 70KE1 and stick contact 206 of relay 70KE2. With both of the relays 70KE1 and 70KE2 picked up (Fig. 2B) an energizing circuit for the amber light A under the bull's eye 70L is energized through a circuit including front contacts 201 and 204 of the relays 70KE2 and 70KE1, respectively. This energy which flows through the push button contact 70 (Fig. 2A) may also flow through back contact 203 of relay 70KA2 and wire 1Z and through the winding of the relay 7KR2 resulting in the picking up of this relay 7KR2. The picking up of relay 7KR2 will close a circuit for the lamp 70L on the ATC panel (Fig. 2D) through front contact 210 of relay 7KR2, wire in conduit 17Z to indicating lamp 70L (Fig. 2D), to indicate in the ATC office that a plane is occupying the route under consideration. The attendant at the ATC office may now, and we assume that he does, return his entrance button 7NQ to the normal off position. This will deenergize the relay 7AP and in turn the relays 7AR and 7ER in the two air transport offices (Figs. 2A and 2B).

The picking up of the relay 7KR2 (see Fig. 2C) will result in the opening of its back contact 190 thereby opening one circuit for the timing relay 7TR and the final clearance relay 7CR, the other branch of which circuit is opened momentarily by the momentary dropping of the front contact 192 of the relay M associated with the relay 7KR2, as a result of which both the timing means 7TR and the final clearance relay 7CR are immediately deenergized, the timing means 7TR being quick dropping and slow picking up. In fact this timing means is preferably a motor operated timing device such as disclosed in the patent to Field, No. 2,199,335, granted April 30, 1940. Dropping of the timing relay 7TR will result in the extinguishment of the lamp 225 located in the entrance button 7NQ. Dropping of the final clearance relay 7CR will result in the removal of energy from the stationary portion of contact 45 of the entrance button 7NQ so that all of the YR relays and entrance or departing relays which were picked up by turning this entrance button, and which are not now stuck up, to be deenergized, as is also true of the advance clearance relay 7GR which will have its stick circuit broken at the front contact 199 of the relay 7CR. As already pointed out relays 23DR, 25ER, 25DN, 26EN, 26DN and 5XRP had their respective stick circuits closed from the time they were picked up. Relay 23EN had its stick circuit closed at back contact 170 of the timing device 7TR (corresponding to a back contact such as contact 109—113 of the timing device in said Field patent) through wire 30Z upon dropping of this relay 7TR. The return of the entrance button 7NQ to its normal position also results in the dropping of relay 7AP and the extinguishment of the lamps R and A under the bull's eye 7AQ and 7EQ, respectively.

Not only does the depression of push button 70 in the American Airline office (see Fig. 2A) result in the illumination of a red lamp under its bull's eye 70L and the illumination of an amber light A under the push button 70 in the American Airline office and the Eastern Airline office, respectively (Figs. 2A and 2B), but it also results in the illumination of the lamp 70L located on the panel in the ATC office and illustrated in Fig. 1D and also shown in Fig. 2C, which lamp 70L is lighted through the medium of a circuit including the front contact 210 of the relay 7KR2 through wire in conduit 17Z to lamp 70L (Fig. 2D). Since a predetermined lapse of time, say ten minutes, is required before the timing relay 7TR will again assume its front contact closing position, it being understood that its energizing circuit was only momentarily broken, the relay 23EN is maintained energized through this stick circuit. The attendant in the ATC office is therefore unable to set up either advance clearance or final clearance of a route at the 7000 foot elevation beginning at the check point Q until the timing means 7TR assumes its energized position, it being understood that the timing device 7TR was immediately reenergized at the front contact 192 of the relay M associated with relay 7KR2 (Fig. 2C), although he may energize YR relays, entrance relays, and departing relays. Eventual picking up of timing means 7TR results in opening at contact 170 of the stick circuit for relay 23EN.

Let us now assume that the pilot of the airplane under consideration radio-phones to the dispatcher at the American Airline office that he has descended below the 6000 foot altitude. In response to this information the dispatcher at the American Airline office will pull out his push-and-pull button 70 and will depress his push-and-pull button 72. This pulling out of the button 70 (Fig. 2A) will result in the extinguishment of the red light associated with bull's eye 70L in the American Airline office and in the extinguishment of the amber lamp associated with the bull's eye 70L in the Eastern Airline office (Fig. 2B), and will also result in the extinguishment of the lamp 70L located in the ATC office (Fig. 2D). The dispatcher in the American Airline office will thereupon depress his push-and-pull button 72 resulting in the deenergization of the relay 72KA2 in the American Airline office (see Fig. 2A) and in the energization of the relay 72KE1 in the Eastern Airline office (see Fig. 2B). The dropping of the relay 72KA2 and the picking up of the relay 72KE1 will result in the energization of the red lamp R under the bull's eye 72L in the American Airline office and will result in the illumination of the amber lamp A under the bull's eye 72L in the Eastern Airline office. This manipulation of the push-and-pull button 72 in the American Airline office will also result in the picking up of the relays 72KP (Fig. 2C) resulting in the illumination of the lamp 72L in the ATC office through the medium of front contact 211 of the relay 72KP and a wire in conduit 17Z, this lamp 72L also being illustrated in Fig. 1D of the drawings. The energization and picking up of the relay 72KP results in the momentary dropping and again picking up of its associated relay M. Since, however, the front contact 169 of the relay 72KP closes before the front contact 168 of its associated relay M momentarily opens the stick circuits for the relays 23DR and 25ER (see Fig. 2D) will not be broken. In other words, the interlocking function which these relays 23DR and 25ER perform will continue until the relay 72KP is again deenergized at which time the momentary opening of the contact 168 of the associated relay M takes place after opening of this front contact 169 of relay 72KP.

We may assume that by this time the timing device 7TR has again opened its back contact 170 and has reclosed its front contacts 170 and 194. Up to this time the entering normal relay 23EN was held energized and by its open back contact 106 prevented a route being set up over entering route portion ER at point 23. Also the entrance button 7NQ is still ineffective to set up a new lighted route starting at this point 7NQ and ending at exit point 7XR because the relay 23DR is still in its energized position and holds contact 102 open. It is however effective to allow a second plane to follow the first plane over the same route. The opening of back contact 170 of timing device TR now drops the relay 23EN.

Let us now assume that the pilot of the airplane under consideration now radio-phones to the dispatcher at the American Airline office and informs him that he has descended to the 5000 foot altitude. In response to this information the dispatcher at the American Airline office will pull out his push-and-pull button and light 72L and will depress his push-and-pull button and light 80L. The depression of the push button 80 containing the bull's eye 80L in the American Airline office will cause illumination of the red lamp R associated with this bull's eye 80L of the American Airline office shown in Fig. 2A and will for reasons heretofore explained illuminate the amber lamp A associated with the bull's eye 80L of the Eastern Airline office shown in Fig. 2B of the drawings through wire 11Z and will for reasons heretofore described result in the picking up of the relay 5KR1 (Fig. 2C) through wire 11Z. The picking up of relay 5KR1 will, through the medium of closure of the front contact 214 of this relay 5KR1, result in the illumination of the lamp 80L located in the ATC office (Fig. 2E) and also illustrated in Fig. 2C of the drawings. These combined push-and-pull buttons and lamps 70L, 72L, 80L, etc., may for convenience be called token lamps or token buttons because each button has associated therewith a square receptacle for receiving a token defining the character of the plane which has advanced to that point over a particular route. These lamps may also be called plane progress lamps by reason of the function they perform. When the token lamp push-and-pull button 72L was pulled out and the relay 72KP (Fig. 2C) dropped away the stick circuits for the relays 23DR and 25ER (Fig. 2D) were momentarily broken, by the momentary opening of contact 168 of relay M after contact 169 of relay 72KP was open, to release these relays 23DR and 25ER. This results in the removal of the interlocking function which these relays 23DR and 25ER perform. Also, dropping of the entering reverse relay 25ER by the opening of its front contact 155 results in the deenergization of the departing normal relay 25DN by the opening of its stick circuit, which relay 25DN by the opening of its front contact 153 results in the deenergization and dropping away of the entering normal relay 26EN by the opening of its stick circuit. The route which was formerly set up from the entrance button 7NQ to the exit button 5XR has now been broken down or cleared out by rear end release up to the point of the token lamp 80L (see Figs. 1D, 2A, 2B and 2E). The exit stick repeater relay 5XRP however remains stuck up and continues its interlocking function through the medium of its open back contacts 141 and 142 so that the ascending and descending routes passing through points corresponding to locations of lamps 58L and 61L cannot be set up.

Let us now assume that the pilot of the plane under consideration has reached the check point R (Fig. 1D) and by radio-phone informs the dispatcher at the American Airline office that he has reached this check point R. In response to this information, the dispatcher having in the meantime been assigned a route to continue the flight of this plane at the 5000 foot altitude, he will in response to this information pull out the token light button 80 thereby causing the extinguishment of the red lamp R associated with the token bull's eye 80L in the American Airline office of Fig. 2A and resulting in the extinguishment of the amber lamp A associated with a similar token bull's eye 80L in the Eastern Airline Office EA shown in Fig. 2B of the drawings. This pulling out of the token lamp button 80L at the American Airline office will also result in the deenergization of the lamp 80L in the ATC office due to the denergization of the relay 5KR1 (Fig. 2C). This is true since upon the dropping of the relay 5KR1 the front contact 117 of the relay 5KR1 opens permanently before the front contact 121 of its associated repeater relay M opens momentarily its contact 121 and the stick circuit for the exit repeater relay 5XRP, causing extinguishment of the exit lamp 5XRL shown in Fig. 2E of the drawings. Also, dropping of this exit repeater relay 5XRP by the opening of its front contact 151 breaks the stick circuit for the departing normal relay 26DN so that now all of the entering relays, all of the departing relays, and all of the exit relays are deenergized. Dropping of the departing normal relay 26DN by the reclosing of its back contact 143 allows a route extending from point 26 to point 24 to be set up. In other words, the entire route which was set up by the attendant in the ATC office has been extinguished step-by-step by the dispatcher in the American Airline office and during this entire period the dispatcher in both the American Airline office and the Eastern Airline office, as well as the attendant in the ATC office, were advised of the progress of the plane over the route.

As above pointed out the attendant in the ATC office is capable of setting up a tentative route, that is, establish advance clearance over a particular route, by causing the steady illumination of lamps on his own control board and also on the indication boards in the American Airline office and the Eastern Airline office. There would be no particular advantage in giving advance clearance followed by final clearance for a particular airline unless the advance clearance route could be cancelled in some manner. Although the attendant at the ATC office may return his entering button 7NQ to its normal position and may thereby drop the relay 7AP (see Fig. 2C) resulting in the deenergization of the lamps R and A under the bull's eye 7AQ and 7EQ, respectively (Figs. 2A and 2B), he cannot extinguish entrance lamp 225 (Fig. 2D) nor extinguish the exit lamps 5XRL in either the ATC office or in either of the two airline offices, nor can he drop the various entrance and exit relays which have in the meantime been held up by their respective stick circuits. The advance clearance set up may, however, be cancelled by cooperation of the attendant at the ATC office and the dispatcher at the particular airline office for which advance clearance had been set up. This cooperation consists of the return of the entrance button in the ATC office to normal and in the request, as by telephone, by the attendant in the ATC office for the dispatcher at the said airline office to depress all of the token buttons contained in the route over which advance clearance has been given and to then pull out all of these token buttons. It is, of course, understood that this pushing in and pulling out of the token buttons 70, 72 and 80 with the entrance button 7NQ in its normal position will result in the deenergization of all of the stick relays of the route extending from the entering point 7NQ to the exit point 5XR.

In order to get a better understanding of the entrance-exit type circuits employed let us now assume that the attendant at the ATC office wishes to set up a route beginning at the 7000 foot altitude at the point Q and ending at the 7000 foot altitude at the point R (Figs. 1D and Figs. 2D–2G). Let us also assume that in this case the route is intended to be used by the Eastern Airline office (Fig. 2B). The attendant at the ATC office will therefore rotate his entrance button 7NQ in a right-hand direction (for use by the American Airline office it would have been rotated to the left) to a point where the contact 46 is closed to pick up the relay 7EP through wires 19Z and 20Z. The picking up of the relay 7EP results in the polar relay 7AR (Fig. 2A) assuming its left-hand energized position and in the polar relay 7ER (Fig. 2B) assuming its right-hand energized position, thereby resulting in the red illumination of the bull's eye 7EQ and the amber illumination of the bull's eye 7AQ in Figs. 2B and 2A, respectively. Also, the operation of the entrance button 7NQ toward the right will result in the closure of the contact 45 resulting in the energization of the initiating network at one end and the picking up of the relays 23YR, 24YR and 26YR all for reasons heretofore pointed out. In order to have the proposed route terminate at the 7000 foot elevation and at the point R the attendant at the ATC office must depress the exit button 7XR.

Let us assume that the exit button 7XR is depressed. This will, of course, result in the energization of the initiating network at the other end and picking up of the exit relay 7XRR through a circuit including contacts 45, 100, 101, 102, wire 38Z, contacts 103, 110, 112, wire 53Z, contact 113, wire 70Z, and contact 114. The exit relay 7XRR will of course be stuck up through a stick circuit including its stick contact 115, so that the exit button 7XR may be immediately released. The picking up of the exit relay 7XRR will result in the energization of the exit repeater relay 7XRP through a circuit including the front contact 116 of the exit relay 7XRR and wire 59Z. The picking up of the exit repeater relay 7XRP will by the opening of its back contacts 141 and 142 prevent a west-bound route which crosses the east-bound route under consideration being set up. Picking up of the exit repeater relay 7XRP through the medium of its front contact 126 will result in the energization of the completion network and by the picking up of the departing normal relay 24DN through a circuit including back contact 127 of relay 24DR, which in turn by the closing of its front contact 128 will result in the picking up of the entering normal relay 24EN through a circuit including the front contact 129 of the relay 24YR and a back contact 130 of the relay 24ER. The picking up of the relay 24EN through the medium of its front contact 131 and wire 39Z will result in the picking up of the relay 23DN through back contact 132 of relay 23DR. This relay 23DN by the closure of its front contact 133 will result in the picking up of the relay 23EN through a circuit including front contact 134 of the relay 23YR and back contact 140 of relay 23ER. With these relays 23EN, 23DN, 24EN, 24DN now all picked up, stick circuits for the relays 23DN, 24EN and 24DN will now be closed for reasons heretofore pointed out. The stick circuit for the relay 23DN includes its stick contact 154 and the front contact 177 of the relay 23EN. The stick circuit for the relay 24EN includes the front contact 153 of the relay 23DN, wire 40Z and its stick contact 152, and the stick circuit for the relay 24DN includes its stick contact 150 and the front contact 151 of the exit repeater relay 7XRP. It is, of course, understood that with the exit repeater relay 7XRP now energized and maintained up in a manner pointed out in connection with exit relay 5XRP, its front contact 123 through wire 5Z will result in the illumination of the lamp 7XRL in the ATC office and through this same wire 5Z will result in the energization of similarly designated lamps 7XRL in both the American Airline office and the Eastern Airline office (Figs. 2A and 2B).

Let us now assume that the Eastern Airline office is ready to accept the route extending from point Q to point R at the 7000 foot altitude and informs the attendant at the ATC office of this fact. The attendant at the ATC office will now depress his push button 7NQ to close the contact 47 thereof and close a pick-up circuit through wire 22Z for the relay 7CR, the relay 7GR having picked up through wire 29Z in response to the picking up of the relay 23EN. Picking up of the final clearance relay 7CR will result in the flashing of the entering lamp 225 in the ATC office (Fig. 2D), in the American Airline office (Fig. 2A) and the Eastern Airline office (Fig. 2B) for reasons heretofore pointed out. The picked up final clearance relay 7CR through its front contact 199 closes a stick circuit for the advance clearance relay 7GR, and the final clearance relay 7CR is stuck up through its stick contact 196 as a result of which energy is applied to the stationary portion of contact 45 of entrance button 7NQ through front contact 160 of relay 7CR and wire 23Z, so that the attendant at the ATC office is rendered helpless insofar as deenergization of the relays 23EN, 23DN, 24EN, 24DN and 7XRP is concerned. In other words, the attendant at the ATC office cannot take the route away from the Eastern Airline office which has been authorized to use this route.

As the plane authorized to fly over this route by the dispatcher of the Eastern Airline office now proceeds over this route and reports back from time to time the dispatcher at this Eastern Airline office will depress and pull out the token buttons 70 and 78 sequentially in that order. The pushing in and pulling out of the button 70 will result in the deenergization of the timing device 7TR for a period of ten minutes, which after the expiration of the ten minute period will result in the deenergization of the entrance relay 23EN by the opening of its stick circuit including wire 39Z at back contact 170 of the relay 7TR, it being assumed that the attendant at the ATC office has in the meantime returned his entrance button 7NQ to its normal position. Dropping of the entrance relay 23EN will result in the opening at its front contact 177 in the stick circuit for the relay 23DN. Dropping of the relay 23DN by the opening of its front contact 153 will result in the opening of the stick circuit for the relay 24EN and dropping of this relay. The departing normal relay 24DN will, however, be maintained energized through its stick circuit including the front contact 151 of the exit repeater relay 7XRP. The timing device 7TR now being reenergized allows a route starting at the 7000 foot altitude at point Q up to a point corresponding to the token light 78L now to be set up. Also, with each of the relays 23ER, 23DN, 23DR, 24EN, 24ER and 24DR now all deenergized ascending and descending routes over points 23 and 24 may be set up on the airplane traffic boards. The subsequent pushing in and pulling out of the token button 78 (Fig. 2B) will for reasons heretofore pointed out result in the momentary breaking of the stick circuit including wire 31Z for the exit repeater relay 7XRP by the momentary opening of contact 193 of relay M associated with relay 7KR1. The dropping of relay 7XRP will extinguish the exit lamp 7XRL located in the ATC office, in the American Airline office and in the Eastern Airline office. This dropping of relay 7XRP will also result in the opening of its front contact 151 included in the stick circuit of the departing normal relay 24DN and in the dropping of this relay 24DN.

From the foregoing description of the operation of the system to establish two different routes starting at the same entrance point 7NQ and ending at exit points 5XR and 7XR it should be understood that the system functions in exactly the same way irrespective of whether an exit button at the 7000 foot altitude or an exit button at the 5000 foot, a lower or a higher altitude has been depressed, except that different entrance and exit relays are picked up and stuck up through stick circuits, and different conflicting control routes are locked out. In each instance the stick circuits for these entrance and exit relays are so associated with the push-and-pull token buttons located in the airline offices that these entrance and departing relays will be successively dropped in accordance with the progress of the plane over check points on the route as reported by the pushing in and pulling out of the token buttons located in the airline offices at points corresponding to these check points.

Let us now observe how the apparatus functions when contact flight rules are observed. As heretofore pointed out the contact flight rules are rules which govern during periods of good visibility and under these conditions the responsibility of avoiding collision is entirely in the hands of the pilot of the plane, the pilot, however, being required to fly over the route as is signified by the route defining radio beam. In order to put these contact flight rules into effect and in order to indicate the same in force in the American Airline office and the Eastern Airline office the attendant at the ATC office will operate his switch 95 to its left-hand dotted position. This will result in the energization and picking up of the contact flight relay FCR (Fig. 2C) through a circuit including wire 16Z. With this relay FCR assuming its picked up position all of the timing relays 7TR, 5TR, etc., will be permanently energized so that the ten minute time interval delay heretofore mentioned is not imposed. This is accomplished through the medium of front contacts 96 and 97 of this relay FCR. Also, the closure of front contact 98 of this relay FCR results in the energization and picking up of contact flight repeater relays FCRPA and FCRPE located in the American Airline office and in the Eastern Airline office, respectively (Figs. 2A and 2B), through wire 6Z. The picking up of these relays FCRPA and FCRPE result in the extinguishment of the instrument flight lamps 66 and in the illumination of the contact flight lamps 79 in the two airline offices. Also, the picking up of the contact flight relay FCR in the ATC office by the opening of its back contact 96 results in the permanent opening of all of the stick circuits for the various entrance and departing relays of the completion network heretofore described except the first entering normal relay, such as 23EN, of this group. These latter relays, such as relay 23EN, for instance, have their stick circuits held open permanently at the back contacts 170 of the timing relays, such as timing relay 7TR, these timing relays being held permanently energized as already pointed out. Attention is directed to the fact that the contact flight relays FCR, FCRPA and FCRPE are all normally deenergized and thereby when deenergized enforce the more severe rules, namely, instrument flight rules. This precaution is resorted to in order that upon the break in an energizing circuit for one of these relays a more strict rule than was contemplated is imposed automatically.

It is thus seen that under contact flight rule conditions the interlocking feature heretofore pointed out continues only so long as the attendant at the ATC office has not returned his entrance button of a particular route to its normal position. In other words, under contact flight rule conditions, that is, with the lever 95 (Fig. 2E) in its dotted closed position, no time delay is imposed upon the attendant in the ATC office in the authorization of a second plane to follow a first plane over a particular route, or over a different route starting at the same check point and altitude, and furthermore the interlocking feature that is inherent in the entrance-exit type interlocking network employed is not imposed, and therefore cancellation by the dispatcher at one of the Airline offices is not required. This interlocking feature is only subject to the entrance button after a route has once been set up and may be rendered ineffective by the attendant at the ATC office returning his entrance button to the normal position.

As already pointed out the crossing of air routes illustrated in Fig. 1A constitutes the crossing in a horizontal plane of two single routes each having a plurality of restricted altitudes.

The actual crossing points at various altitudes have been especially designated by diamond shape figures 37 to 44, inclusive. These points do not only represent crossings but also constitutes points where a plane may move from one straight route to another straight route crossing the former. Let us now assume that the attendant in the ATC office desires to set up, by the illumination of lamps on his board and on the two indicating boards located in the American Airline office and the Eastern Airline office, a route from the 7000 foot altitude at check point R to the 7000 foot altitude at the check point F on the other of two routes crossing each other (Figs. 1A and 3). Referring now to Fig. 3, in order to set up the route from the check point R to the check point F at the 7000 foot altitude the attendant at the ATC office will turn his entrance button 7NR to the right if the route is to be occupied by the Eastern Airline Company, but turns it to the left if the route is to be occupied by a plane of the American Airline Company. By the operation of the button 7NR and closure of its associated rotary contact 230 a circuit portion extending to the exit relay 7XFR including the back contact 231 of the eastward entering relay 39EE, back contact 232 of the relay 39YR, and back contact 233 of the departing north relay 39DN. Another circuit portion is established which extends to one terminal of the exit relay 7XSR which includes the back contacts 231 and 232 just mentioned and also includes the back contact 234 of the departing east relay 39DE.

In order to set up the route heretofore mentioned it will be necessary for the attendant to operate the exit push button 7XF. Depression of this push button 7XF causes energization and picking up of the relay 7XFR, which relay will then be stuck up through its stick circuit including its stick contact 235. The picking up of the exit relay 7XFR through closure of its front contact 236 closes a pick-up circuit for the departing east relay 39DE including the back contact 237 of the relay 39DN. The picking up of the relay 39DE through the medium of its front contact 238 closes a pick-up circuit for the entering north relay 39EN including the back contact 239 of the relay 39YR and also including back contact 240 of the relay 39EE. It may be pointed out at this time that each of the relays 39EE and 39EN is provided with a stick circuit and that the stick circuits for the entering relays 39EE and 39EN and including stick contacts 241 and 242, respectively, are controlled by push-and-pull token buttons 252 and 253 shown for the American Airline office AA and controlled by circuits conventionally illustrated by the dotted lines 243 and 244, respectively, through the medium of a timing relay, in exactly the same manner as the stick circuit for the relay 23EN in Fig. 2D of the drawings is controlled. It should be understood that the entrance buttons 7NE and 7NR as well as all other entrance buttons for the crossing are provided with a timing relay, an advance clearance relay and a final clearance relay such as the relays 7TR, 7GR and 7CR shown in Fig. 2C of the drawings, for the purpose of giving final clearance by the second pushing of the entrance button all in a manner as already described. The push-and-pull buttons 252, 253, 254 and 255 shown on the board in the American Airline office AA but not shown for the Eastern Airplane office are located at points corresponding to the points of location of token lamps 252L, 253L, 254L and 255L on the ATC board (Fig. 3). Also, the departing relays 39DE and 39DN are provided with stick circuits, including stick contacts 245 and 246, respectively, which are controlled by push-and-pull buttons 254 and 255 located in the offices AA and EA in exactly the same manner as the stick circuit for the exit repeating relays, such as 7XRP (Fig. 2E), are controlled. These push-and-pull buttons, their associated apparatus and the stick circuits they control have been conventionally illustrated by dotted lines 247 and 248. With the departing east relay 39DE now energized the exit light 7XFL is illuminated in response to the closure of an energizing circuit for its lamp including the front contact 258 of the relay 39DE. Similarly, the lamp 249 in the entrance button 7NR is lighted through an energizing circuit including the front contact 250 of the relay 39EN. The east-bound crossing routes for altitudes of 3000 feet, 5000 feet and 9000 feet are controlled in exactly the same manner as the crossing for the 7000 foot altitude illustrated and all of the west-bound routes are controlled in like manner for which reason their relays and circuits have for convenience been omitted.

It is, of course, understood in view of the fact that the stick circuits for the relays 39EE, 39EN, 39DE and 39DN are controlled in the same manner as corresponding relays illustrated in Figs. 2E, 2F and 2G are controlled that these relays 39EN and 39DE were successively dropped as the token lights 253L and 254L were extinguished. It should also be noted that although the exit lamp 7XFL was illuminated immediately in response to operation of the entrance button 7NR and exit button 7XF it was not extinguished until the relay 39DE was dropped in response to operation of the push-and-pull button 254.

Let us now assume that the attendant at the ATC office wishes to set up a route at the 7000 foot altitude from the check point E (Figs. 1D and 3) to the check point S (Figs. 1E and 3), and that in order to visually indicate this route he will operate the entrance button 7NE and the exit button 7XS in that order. Operation of the entrance button 7NE by the closure of its rotary contact 230 will close an energizing circuit for the relay 39YR including the back contact 261 of the relay 39EN. The picking up of the relay 39YR will then continue this circuit through its front contact 232 through back contact 234 of relay 39DE to the exit relay 7XSR and will also continue this circuit through the back contact 233 of the relay 39DN to one terminal of the relay 7XFR. Since, however, the attendant has depressed the push button 7XS only the exit relay 7XSR will be energized. The picking up of the relay 7XSR results in the closure of its stick circuit including its stick contact 262. Also, the picking up of the relay 7XSR through closure of its front contact 263 closes a pick-up circuit for the relay 39DN including back contact 264 of the relay 39DE. The picking up of the relay 39DN by the opening of its back contact 233 breaks the circuit extending to the exit relay 7XFR and by closure of its front contact 266 closes an energizing circuit for the relay 39EE including front contact 239 of the relay 39YR and including back contact 267 of the relay 39EN. The picking up of the relay 39EE illuminates the entrance lamp 268 in the entrance button 7NE through front contact 269 of relay 39EE and similarly the picking up of the relay 39DN by the closure of its front contact 270 energizes the exit lamp 7XSL. It may be pointed out here that the contact 260 of the entrance buttons 7NE and 7NR corresponds to the contact 46 of the entrance button 7NQ and controls the same kind of apparatus.

We have now considered two air routes illustrated by illuminated lamps on the board in the ATC office and the American Airline office AA illustrated in Fig. 3, these routes extending from the entrance point R to the exit point F and from the entrance point E to the exit point S. The first of these routes starts on the diagonal route illustrated in Fig. 3 and terminates on the west-east route illustrated, whereas the second of these routes starts on the west-east route and terminates on the diagonal route illustrated in Fig. 3, that is, in neither case does one route cross another, but a switch, so to speak, from one route to another takes place. Obviously, a straight through route crossing the other route may be set up.

Let us now assume a route starting at the entrance point E and ending at the exit point F which is a route crossing the route extending from the entrance point R and ending at the exit point S. In order to set up the proposed route by the illumination of lamps on the control board the attendant in the ATC office will operate his entrance button 7NE either to the left or to the right depending upon whether the route is to be used by the American Airline office or by the Eastern Airline office, respectively. The attendant will then depress the exit button 7XF. The operation of these buttons 7NE and 7XF will result in the energization of the relay 39YR through a circuit starting from a terminal (+), through contacts 230 and 261 of button 7NE and relay 39EN, respectively. Upon picking up of the relay 39YR the circuit just traced is continued through the front contact 232 of the relay 39YR, through back contact 233 of the relay 39DN, through the winding of the relay 7XFR and push button contact 7XF, to the other terminal (—) of the same source of current. Upon picking up of the relay 7XFR in response to the closure of the circuit just traced this relay will be stuck up through its front stick contact 235.

The picking up of the relay 7XFR will cause the successive picking up of the relays 39DE and 39EE in that order all for reasons heretofore explained. The picking up of the relay 39EE will cause illumination of the lamp 268 in the entrance button 7NE and the picking up of the departing relay 39DE will cause illumination of the indicating lamp 7XFL through the medium of front contact 258 of this relay 39DE. The attendant at the ATC office may now depress the push button 7NE to close the push contact 271 to result in the picking up of a final clearance relay, such as the relay 7CR illustrated in Fig. 2C of the drawings. This picking up of the final clearance relay will cause the entering lamp 268 to be flashed in a manner as already explained in connection with Fig. 2C. This flashing of the lamp 268 and a corresponding red lamp in one of the airline offices, and an amber lamp in the other airline office, will inform the dispatcher in the former airline office that he may by radio telephone instruct the pilot of an airplane approaching the check point E at the 7000 foot altitude to proceed to the check point F at this same altitude without any fear of a plane crossing that route authorized to fly at the same altitude from the air route extending from the check point R to the check point S. As soon as this airplane has reported its passing over the check point E the dispatcher at the particular airline office which is occupying the route will push his push-and-pull button 252 resulting in the illumination of the lamp 252L (Fig. 3) to inform the attendant in the ATC office of the movement of an east-bound plane at the 7000 foot altitude from the check point E to the check point F, similar lamps 252L being lighted on the boards in the American Airline office and the Eastern Airline office. When the plane has passed beyond the crossing identified by the diamond-shape point 39 the pilot will, by radio 'phone, report to his dispatcher of this fact. The dispatcher will then pull out the push-and-pull button 252 and will depress the push-and-pull button 254. This operation of the push-and-pull buttons 252 and 254 will result in the extinguishment of the token lamp 252L in each of the airline offices and in the ATC office, and will also result in the momentary breaking of the stick circuit for the relay 39EE, this on the assumption that the attendant in the ATC office has, in the meantime, returned his entrance button 7NE to its normal position. When the pilot in the plane under consideration reaches the check point F he will again report back to the dispatcher of the airline company, whose plane he is flying, of this fact. In response to this information the dispatcher of such airline office will pull out his push-and-pull button 254 causing extinguishment of the token lamp 254L and also causing the momenatry opening of the stick circuit for the departing east relay 39DE for reasons heretofore pointed out in detail, resulting in the extinguishment of the exit lamp 7XFL on the board in the ATC office, the token lamps 254L in each of the airline offices having been extinguished directly in response to the pulling out of the push-and-pull button 254.

It is thus understood that the portion of the board in the AT office illustrated in Fig. 3 of the drawings shows how airplane routes at certain altitudes may be visually indicated by an illuminated diagram and also illustrates how the accidental setting up of two routes in conflict with each other is prevented by interlocked circuits of the entrance-exit construction. This apparatus in Fig. 3 also illustrates how these illuminated routes located on the board in the AT office and in each of the airline offices may be extinguished section by section in response to the operation of token buttons in the airline offices. In other words, not only is provision made for interlocking circuits reflecting conflicting routes in a vertical plane but such interlocking for routes conflicting with each other in a horizontal plane have also been provided.

In Figs. 2A–2G of the drawings, of which Figs. 2A and 2B should be laid the first above the second, to the right-hand of which should be laid Figs. 2C to 2G, inclusive, in that order constituting a wiring diagram which as a whole has been referred to as Fig. 2. Many of the wires of Fig. 2 extend from one sheet to another and for this reason have been designated by reference characters Z1 to Z82, inclusive. Many of these reference characters Z1—Z82 have been referred to in the specification whereas others have not been mentioned because the specific circuits in which they are included have not been traced. These reference characters have, however, been added in order to facilitate the study of all of the circuits disclosed in Fig. 2 of the drawings.

Having thus shown and described one rather specific embodiment of the invention it is desired to be understood that the particular embodiment illustrated and described is not to be construed as disclosing all forms the invention may take, but has been selected for the purpose of disclosing the underlying principles of the invention, its mode of operation and the functions performed thereby, and it is further desired to be understood that various changes, modifications and additions may be made to the particular embodiment of the invention disclosed without departing from the spirit or scope of the invention except as demanded by the scope of the following claims.

What I claim as new is:

1. An indicating system for indicating routes for airplane travel comprising, a dispatcher's board signifying by the face thereof a ground route, indicators on said board for by their location in a horizontal direction on the board indicating successive check points and by their location in a vertical direction on said board indicating different altitudes at such check points, one altitude for each route and including routes starting at one altitude and ending at another altitude, said indicators by being active indicating the flight route or routes over which airplane travel has been authorized, control circuits for controlling said indicators, manually controlled contacts for controlling said circuits, relays controlled by said circuits, and contacts in some of said circuits operated by relays of other circuits for interlocking said circuits to prevent a route in conflict with a route over which airplane travel has already been authorized from being set up.

2. An indicating system for indicating routes for airplane travel comprising, a dispatcher's board signifying a route over the ground, indicators on said board for by their location on the board in a horizontal direction indicating successive check points and by their location in a vertical direction on said board indicating different altitudes at such check points, said indicators by being active indicating the flight route or routes over which airplane travel may be or has been authorized, control circuits for controlling said indicators, manually controlled contacts for controlling said circuits to set up a flight route but incapable of cancelling a set-up route, relays controlled by said circuits, contacts in some of said circuits operated by relays of other circuits for interlocking said circuits to prevent a route in conflict with a route over which travel has already been tentatively or actually authorized from being set up, and other contacts not accessible by the person operating said manually controlled contacts but manually operable only by someone other than said person to cancel a set-up route.

3. An indicating system for indicating routes for airplane travel comprising, a dispatcher's board signifying a ground route, indicators on said board for by their locations horizontally displaced on the board indicating various check points and by their vertical displacement indicating different altitudes, said indicators by being active indicating the flight route or routes over which airplane travel may be or has been authorized, control circuits for controlling said indicators, manually controlled contacts for controlling said circuits to set up a route but incapable of cancelling a set-up route, relays controlled by said circuits, contacts in some of said circuits controlled by relays of other circuits for interlocking said circuits to prevent a route in conflict with a route over which travel has already been authorized from being set up, cancelling means controlled by a person other than the person operating said manually controlled contacts to cancel at least a portion of a set-up route, and timing means set into operation by said cancelling means to prevent a second setting up of the same route until after the lapse of a predetermined period of time.

4. An indicating system for indicating routes over which airplane travel may be authorized comprising, a main dispatcher's board signifying a ground route, a company dispatcher's board, indicators for by their locations horizontally indicating check points on said ground route and by their location vertically on the board indicating different altitudes one altitude for each route check points, said indicators by being active indicating flight routes over which travel by airplane may be or has been authorized, control circuits for controlling said indicators on the main dispatcher's board, relays controlled by said circuits, manually controlled contacts for controlling said circuits, contacts in some of said circuits controlled by the relays of other circuits for interlocking said circuits to prevent a route in conflict with a route over which travel by airplane has already been authorized from being set up, and circuits for the indicators located on said company dispatcher's board controlled by the said control circuits.

5. An indicating system for indicating routes over which airplane travel may be authorized comprising, a main dispatcher's board, a company dispatcher's board, indicators for by their location on the boards horizontally indicating successive check points on the ground and by their locations vertically indicating different altitudes one altitude for each route check point, said indicators by being active indicating flight routes over which travel by airplane may be or has been authorized, control circuits for controlling said indicators on the main dispatcher's board to set up routes on the board to authorize airplane travel thereover, relays controlled by said circuits, manually controlled contacts on said main board for controlling said circuits to set up routes, contacts in some of said circuits controlled by the relays of other circuits for interlocking said circuits to prevent a route in conflict with a route over which travel by airplane has already been authorized from being set up, circuits for the indicators located on said company dispatcher's board controlled by the said control circuits, and means manually controllable only by a person at said company dispatcher's board for cancelling a portion of a set-up route on both boards without cancelling the rest of such route on both boards.

6. An indicating system for indicating routes over which airplane travel may be authorized comprising, a main dispatcher's board, a company dispatcher's board, indicators for by their locations on the boards horizontally indicating successive check points on the ground and by their locations vertically indicating different altitudes, said indicators by being active indicating flight routes over which travel by airplane may be or has been authorized, control circuits for controlling said indicators on the main dispatcher's board, relays controlled by said circuits, manually controlled contacts at said main dispatcher's board for controlling said circuits to render some of said indicators active but incapable of rendering the indicators of an authorized route inactive, contacts in some of said circuits operated by the relays included in other circuits for interlocking said circuits to prevent a route in conflict with a route over which travel by airplane has already been authorized from being set up, circuits for the indicators located on said company dispatcher's board controlled by the said control circuits, and contacts at said company dispatcher's board for cancelling a route on both boards over which airplane travel has been authorized by rendering the indicators thereof inactive.

7. An interlocked indication system for indicating authorized airplane flights over routes not in conflict with each other comprising, airplane routes at constant altitudes and airplane routes starting at one altitude and ending at another altitude in the same vertical plane and in conflict with at least some of said first mentioned routes, a panel board in an air transport office having indicators thereon which by their location on the panel board both vertically and horizontally and by their indicating condition may indicate such routes, and circuits for controlling said indicators interlocked so that if a particular route has been authorized and indicated a second route in conflict therewith cannot be indicated.

8. An interlocked indication system for indicating authorized airplane flights over routes not in conflict with each other comprising, airplane routes some of which are and others of which are not in conflict with each other, a panel board in an air transport office having indicators thereon which by their location on the panel board and their indicating condition may indicate such route or routes, circuits for said indicators interlocked so that if a particular route has been indicated a second route in conflict therewith cannot be indicated, and manually operable timing means for preventing the setting up of an indication for a second airplane over the same route at least until after the lapse of a predetermined period of time following the starting out of the first airplane over such route.

9. An interlocked indication system for indicating authorized airplane flights over routes not in conflict with each other comprising, airplane routes at constant altitudes over a common ground route and airplane routes starting at one altitude and ending at another altitude over the same common ground route in conflict with at least some of said first mentioned routes, a panel board in an air transport office having indicators thereon which by their location on such board and their indicating condition may indicate such routes, circuits for said indicators interlocked so that if a particular route has been conditionally authorized and indicated a second route in conflict therewith cannot be conditionally authorized by being indicated, and means for authorizing final clearance for occupancy of a particular route by an airplane already conditionally indicated by displaying such route on the panel board by another distinctive indication.

10. An interlocked indication system for indicating authorized airplane flights over routes not in conflict with each other comprising, airplane routes at constant altitudes and airplane routes starting at one altitude and ending at another altitude in the same vertical plane and in conflict with at least some of said first mentioned routes, a panel board in an air transport office having indicators thereon which by their location on said panel board and their indicating condition may indicate such routes, circuits for said indicators controlled from an isolated point of authority and interlocked so that if a particular route has been conditionally authorized and distinctively indicated a second route in conflict therewith cannot be conditionally authorized by being distinctively indicated, means for authorizing from such point of authority final clearance for occupancy of a particular route already conditionally indicated by displaying such route by another distinctive indication, and means controlled only from said air transport office for cancelling a route either conditionally or finally set up.

11. An interlocked indication system for indicating authorized airplane flights over routes not in conflict with each other comprising, airplane routes at constant altitudes over a particular ground route and airplane routes starting at one altitude and ending at another altitude over said ground route in conflict with at least some of said first mentioned routes, a panel board in an air transport office having indicators thereon which by their location on such board and by being active may indicate such routes, circuits for controlling said indicators interlocked so that if a particular route has been conditionally authorized and indicated in one manner a second route in conflict therewith cannot be finally authorized by being indicated in another manner, an entrance button at the entrance end of each route on said board, an exist button at the exit end of each route on said board, and means including said circuits effective to render the indicators of a particular route active to indicate conditional clearance in response to actuation of the entrance button and the exit button for that route provided no route in conflict therewith is then being indicated and to cause the same route to be finally cleared by special manipulation of only said entrance button.

12. An interlocking display panel for indicating airplane routes and used to authorize airplane flights over such routes comprising; in combination with a display panel at a first office and a display panel at a second office; a first set of indicators on said display panels which by their location on the panel and condition of indication may indicate one or more routes, not in conflict with each other of a plurality of routes some of which are conflicting, over which route or routes airplanes are authorized to fly by authorization given by an attendant at said second office to a pilot in accordance with the route displayed by said first set of indicators on his panel; a second set of indicators on said display panels for indicating the progress of an airplane over the route indicated by said first set of indicators of such route; circuits controlled from said first office for controlling said first set of indicators interlocked to prevent routes in conflict with each other from being set up; and means controlled from said second office to control said second set of indicators and to cancel the indication displayed by said first set of indicators.

13. Interlocking display panels for indicating airplane routes to authorize airplane flights over such routes comprising; in combination with a display panel at a first office and a display panel at a second office; a first set of indicators on said display panels which by their location on said panels and condition of indication may indicate one or more routes, not in conflict with each other of a plurality of routes some of which are conflicting, over which route or routes airplanes are authorized to fly by authorization given by an attendant at said second office to a pilot in accordance with the route displayed on his panel; a second set of indicators on said display panels for indicating the progress of an airplane over such route; circuits controlled from said first office for controlling said first set of indicators to render them active interlocked to prevent routes in conflict with each other from being set up; means controlled from said second office to control said second set of indicators; and means controllable from said second office only for rendering said first set of indicators inactive.

14. Interlocking display panels for indicating airplane routes to authorize airplane flights over such routes comprising; in combination with a display panel at a first office and a display panel at a second office; a first set of indicators on said display panels which by their location on said panels and condition of indication may indicate one or more routes, not in conflict with each other of a plurality of routes some of which are conflicting, over which route or routes planes may be authorized to fly by authorization given by an attendant at said second office to a pilot in accordance with the route displayed by said first set of indicators on his panel; a second set of indicators on said display panels for indicating the progress of an airplane over such route; circuits controlled from said first office for controlling said first set of indicators interlocked to prevent routes in conflict with each other from being set up; and means controlled from said second office to control said second set of indicators.

15. Interlocking display panels for indicating airplane routes to authorize airplane flights over such routes comprising; in combination with a display panel at a first office and a display panel at a second office; a first set of indicators on said display panels which by their location on said panels and condition of indication may indicate either advance or final clearance over one or more routes, not in conflict with each other of a plurality of routes some of which are conflicting, over which route or routes airplanes are authorized to fly by authorization given by an attendant at said second office to a pilot in accordance with the route displayed by said first set of indicators on his panel; a second set of indicators on said display panels for indicating the progress of an airplane over such route; circuits controlled from said first office for controlling said first set of indicators to indicate either advance or final clearance and interlocked to prevent routes in conflict with each other from being set up; and means controlled from said second office to control said second set of indicators.

16. An interlocking display system for indicating airplane routes to authorize airplane flights over such routes comprising; in combination with a display panel at a first office and a display panel at a second office; a first set of indicators on said display panels which by their location on said panels and condition of indication may indicate either advance or final clearance over one or more routes, not in conflict with each other of a plurality of routes some of which are conflicting, over which route or routes airplanes are authorized to fly by authorization given by an attendant at said second office to a pilot in accordance with the route displayed by said first set of indicators on his panel; a second set of indicators on said display panels for indicating the progress of an airplane over such route; circuits controlled from said first office for controlling said first set of indicators to indicate either advance or final clearance and interlocked to prevent routes in conflict with each other from being set up; and means controlled from said second office to control said second set of indicators and to cancel said first set of indicators.

17. An indicating system for indicating routes for airplane travel comprising, a central office board and a dispatcher's office board each having indicators thereon which by their location on the board and their condition of indication may define conflicting routes one at a time and non-conflicting routes simultaneously, control circuits for controlling said indicators so interlocked that series of indicators defining conflicting routes cannot be rendered active simultaneously but so that one or more non-conflicting routes may be set up simultaneously, manually controlled entrance contacts at the entrance end of each route portion on said central office board, manually controlled exit contacts at the exit end of each route portion on said central office board, means effective if the entrance contacts and the exit contacts for a particular route portion are closed to render the indicators on both boards defining that route portion active provided the indicators of a route in conflict therewith are not already active, and means on said dispatcher's board for rendering said active indicators on both boards inactive.

18. An interlocked indication system for authorizing airplanes to fly over routes not in conflict with each other comprising, a panel board in an office having indicators thereon which by their location on such board and when active indicate routes over which airplane travel may be authorized, circuits for said indicators so interlocked that if a particular route has been indicated a second route in conflict therewith cannot be indicated, entrance control means on said panel board at the entrance end to each route portion, exit control means at the exit end of each route portion on said board, and means effective if the entrance and exit control means of a particular route portion are operated to their active position to cause the indicators of such route portion to be rendered active to indicate conditional clearance thereover unless a route in conflict therewith already has its indicators active, and means for manually controlling such indicators distinctively to indicate final clearance only after conditional clearance has first been indicated.

SEDGWICK N. WIGHT.